United States Patent
Yamaguchi et al.

(10) Patent No.: US 10,397,414 B2
(45) Date of Patent: Aug. 27, 2019

(54) INFORMATION PROCESSING APPARATUS THAT HAS AN ELECTRONIC MAIL FUNCTION AND IS CAPABLE OF OPERATING IN COOPERATION WITH A PORTABLE TERMINAL AND PROGRAM THEREOF

(71) Applicant: Konica Minolta, Inc., Chiyoda-ku (JP)

(72) Inventors: Takehisa Yamaguchi, Ikoma (JP); Hirokazu Kubota, Otsu (JP); Toshimichi Iwai, Nara (JP); Masaya Hashimoto, Itami (JP); Kazusei Takahashi, Nishinomiya (JP); Hiroaki Kubo, Muko (JP); Atsushi Tamura, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 11 days.

(21) Appl. No.: 15/375,581

(22) Filed: Dec. 12, 2016

(65) Prior Publication Data
US 2017/0171402 A1    Jun. 15, 2017

(30) Foreign Application Priority Data
Dec. 14, 2015    (JP) .................. 2015-243002

(51) Int. Cl.
*H04N 1/00*    (2006.01)
*H04L 12/58*    (2006.01)
(Continued)

(52) U.S. Cl.
CPC ......... *H04N 1/00209* (2013.01); *H04L 51/22* (2013.01); *H04L 51/28* (2013.01);
(Continued)

(58) Field of Classification Search
CPC combination set(s) only.
See application file for complete search history.

(56) References Cited

U.S. PATENT DOCUMENTS

| 8,438,232 B2 * | 5/2013 | Tsuboi ................. G06Q 10/107 |
| | | 709/206 |
| 2003/0018730 A1 * | 1/2003 | Mori ....................... H04L 29/06 |
| | | 709/206 |

(Continued)

FOREIGN PATENT DOCUMENTS

| CN | 101479710 A | 7/2009 |
| CN | 102625015 A | 8/2012 |

(Continued)

OTHER PUBLICATIONS

Extended European Search Report issued in corresponding European Patent Application No. 16201385.8-1972, dated May 22, 2017. (7 pages).

(Continued)

*Primary Examiner* — Barbara D Reinier
(74) *Attorney, Agent, or Firm* — Buchanan Ingersoll & Rooney PC

(57) ABSTRACT

An information processing apparatus that has an electronic mail function and is capable of operating in cooperation with a portable terminal includes: a communication unit configured to perform a communication with the portable terminal; a terminal control unit configured to transmit a command of activating an address book application to the portable terminal, and to acquire a transmission destination address and a user address from the portable terminal; a mail creating unit configured to create an electronic mail in which the transmission destination address is set to a transmission destination of the electronic mail, and the user address to a transmission source of the electronic mail; an image acquiring unit configured to acquire an image to be transmitted (Continued)

with the electronic mail; and a mail transmitting unit configured to attach the image acquired by the image acquiring unit to the electronic mail, and to transmit the electronic mail.

16 Claims, 16 Drawing Sheets

(51) Int. Cl.
  *H04N 1/32* (2006.01)
  *H04M 1/725* (2006.01)
  *H04L 29/06* (2006.01)
  *H04W 88/02* (2009.01)
  *H04M 1/2745* (2006.01)

(52) U.S. Cl.
  CPC ...... *H04M 1/7253* (2013.01); *H04N 1/00212* (2013.01); *H04N 1/00307* (2013.01); *H04N 1/00795* (2013.01); *H04N 1/32101* (2013.01); H04L 67/42 (2013.01); H04M 1/274516 (2013.01); H04M 1/274525 (2013.01); H04N 2201/0075 (2013.01); H04N 2201/0091 (2013.01); H04N 2201/0094 (2013.01); H04N 2201/3208 (2013.01); H04W 88/02 (2013.01)

(56) References Cited

U.S. PATENT DOCUMENTS

| | | |
|---|---|---|
| 2003/0203744 A1 | 10/2003 | Otsuka |
| 2005/0002066 A1 | 1/2005 | Reese et al. |
| 2006/0192990 A1* | 8/2006 | Tonegawa .......... H04N 1/00209 358/1.15 |
| 2007/0253035 A1 | 11/2007 | Takesada |
| 2009/0122339 A1* | 5/2009 | Nakamura ............. G06Q 10/10 358/1.15 |
| 2012/0192120 A1* | 7/2012 | Yamaguchi .......... G03G 15/502 715/863 |

FOREIGN PATENT DOCUMENTS

| | | |
|---|---|---|
| JP | 2002-108767 | 4/2002 |
| JP | 2004-032419 | 1/2004 |
| JP | 2007-295150 A | 8/2007 |
| JP | 2007-295150 * | 11/2007 |
| JP | 2009-176159 A | 8/2009 |
| JP | 2012-155436 | 8/2012 |
| JP | 2013-239974 | 11/2013 |
| JP | 2014-027638 | 2/2014 |
| JP | 2014-045418 A | 3/2014 |
| JP | 2015-211350 | 11/2015 |
| WO | 2008/059664 | 5/2008 |

OTHER PUBLICATIONS

Notification of Reasons for Rejection issued in corresponding Japanese Patent Application No. 2015-243002, dated Feb. 13, 2018, with English Translation (15 pages).

Office Action issued by the State Intellectual Property Office of the People's Republic of China dated Sep. 25, 2018 and English Translation (29 pgs).

* cited by examiner

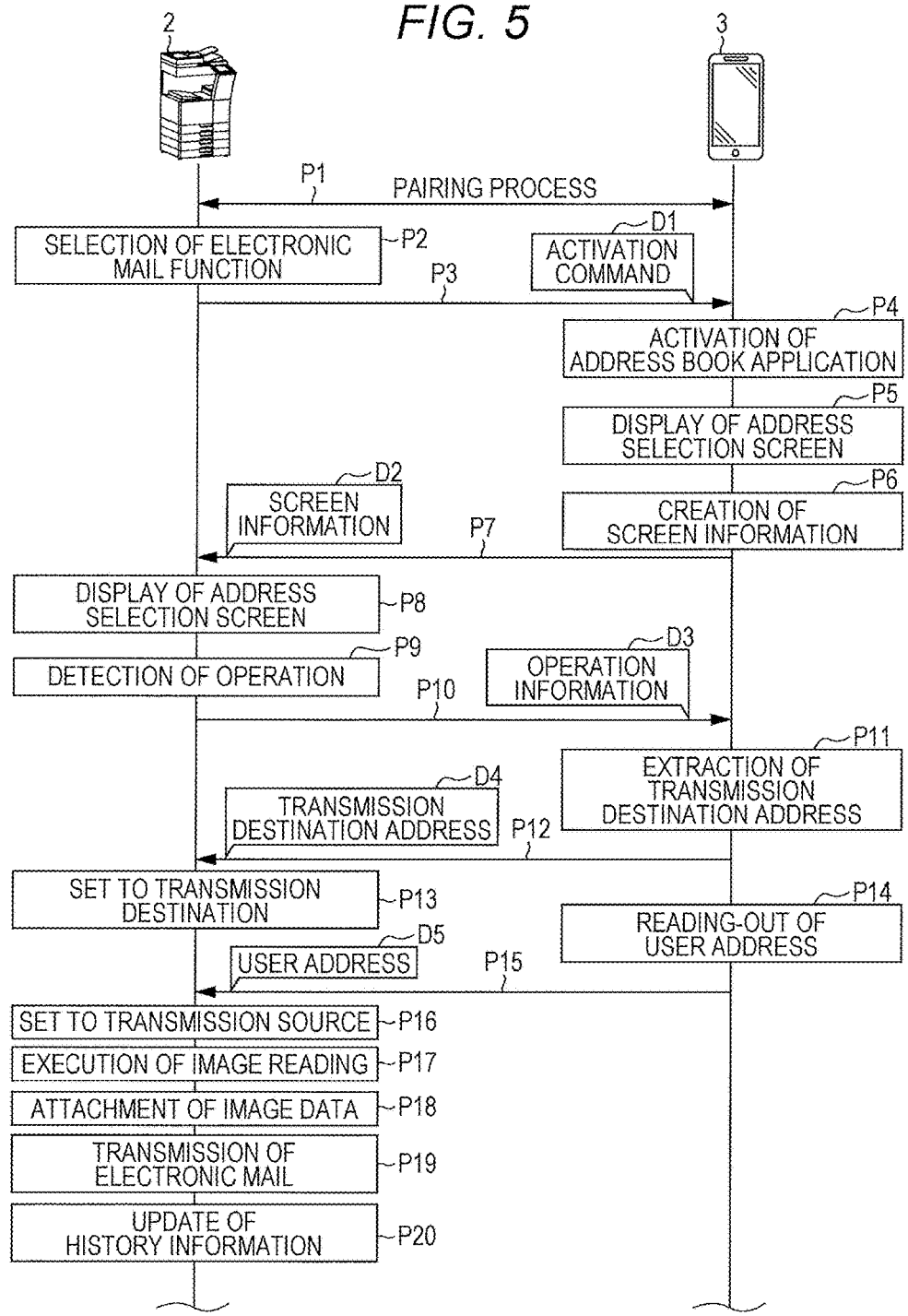

| TRANSMISSION DESTINATION: | Yamada@**.net; Yamamoto@**.net | — 9a |
| TRANSMISSION SOURCE: | MFP@*****.com | — 9b |

SUBJECT: JOBID: 123456

SUBJECT:

Scan to E-mail

TRANSMISSION DESTINATION ADDRESSES DUPLICATE WITH EACH OTHER.
PLEASE DELETE ANY ONE.

DUPLICATION ADDRESS: Yamada@****.net

[ DELETE ADDRESS SELECTED FROM ADDRESS BOOK OF PORTABLE TERMINAL ] — B3

[ DELETE ADDRESS SELECTED FROM ADDRESS BOOK OF MFP ] — B4

| | 27a | 27b | 27c | 27d | 27e |
|---|---|---|---|---|---|
| | DATE | JOB | TRANSMISSION DESTINATION ADDRESS | TRANSMISSION SOURCE ADDRESS | TERMINAL INFORMATION |
| | 20150630 12:03:56 | E-mail | **@*. | @*.** | 1002142 |
| | 20150629 10:42:02 | E-mail | **@*. | *@*.** | 2459642 |
| | 20150620 15:33:21 | E-mail | ***@*. | MFP@****.com | — |
| | 20150618 09:35:44 | E-mail | **@*. | @*.** | 8944563 |

INFORMATION PROCESSING APPARATUS THAT HAS AN ELECTRONIC MAIL FUNCTION AND IS CAPABLE OF OPERATING IN COOPERATION WITH A PORTABLE TERMINAL AND PROGRAM THEREOF

The entire disclosure of Japanese Patent Application No. 2015-243002 filed on Dec. 14, 2015 including description, claims, drawings, and abstract are incorporated herein by reference in its entirety.

BACKGROUND OF THE INVENTION

Field of the Invention

The present invention relates to an information processing apparatus and a program, and particularly, to a technology of transmitting an electronic mail in cooperation between the information processing apparatus and a portable terminal.

Description of the Related Art

In the related art, there is known an information processing system configured to perform various kinds of processing in cooperation between an information processing apparatus such as multifunction peripherals (MFP) and a portable terminal such as a smart phone and a tablet terminal in a state in which the information processing apparatus and the portable terminal can communicate with each other in a wired manner or a wireless manner (For example, JP 2014-45418 A).

In addition, with regard to a system in which an information processing apparatus and a portable terminal cooperate with each other, there is suggested a system in which the information processing apparatus transmits web screen information to the portable terminal in accordance with a request transmitted from the portable terminal, and the portable terminal displays the web screen information (for example, JP 2009-176159 A). In this related art, the web screen information that is displayed in the portable terminal includes a button image that gives an instruction for transmission of FAX or an electronic mail, and the like. When the button image is operated by a user, the information processing apparatus transmits original web screen information to a transmission destination that is designated through FAX or an electronic mail.

Recently, the information processing apparatus such as the MFP is provided with a function of transmitting an electronic mail, and can transmit an image, which is read with a scanning function, to an outer side in a state of being attached to an electronic mail. In this case, an address that is set in advance in the information processing apparatus is recorded in a transmission source address of the electronic mail. However, an information processing apparatus, which is provided in an office and the like, is typically shared by a plurality of users. Therefore, for example, in a case where each of the users transmits an image-attached electronic mail to an outer side by using the information processing apparatus, there is a problem that it is difficult for a receiver of the electronic mail to determine a transmitter of the mail.

To prevent occurrence of the problem, for example, it is considered to employ the following transmission type. Specifically, the information processing apparatus and a portable terminal carried by the user are made to cooperate with each other, and image data, which is read with a scanning function of the information processing apparatus, is input to the portable terminal at once and an electronic mail is transmitted from the portable terminal to an outer side. In this transmission type, since the electronic mail is transmitted from a portable terminal of an individual user, an electronic mail address of the individual user is recorded in the transmission source address, a mail receiver can specify a transmitter of the mail.

However, in a case of employing the transmission type in which an electronic mail is transmitted from a portable terminal as described above, there is a problem that a user is required to perform a complicated operation. That is, in a case of the above-described transmission type, first, a user is required to operate the information processing apparatus to read an image of an original document with a scanning function, to further operate the information processing apparatus to convert image data, which is created with the scanning function, into image data in a data format that can be handled in the portable terminal, and to perform an operation of inputting the image data to the portable terminal. In addition, after inputting the image data to the portable terminal, the user is required to operate the portable terminal to activate an electronic mail function such as a mailer, and to perform an operation of designating the image data, which is input from the information processing apparatus, as an attached file. Accordingly, in a case of inputting the image data to the portable terminal from the information processing apparatus and transmitting the electronic mail, an operation by a user becomes complicated, and thus convenience is poor.

SUMMARY OF THE INVENTION

The present invention has been made to solve the above problems in the related art, and an object of the invention is to provide an information processing apparatus in which the information processing apparatus and a portable terminal are automatically made to cooperate with each other to reduce operation load of a user and to improve convenience during transmission of image data with an electronic mail, and a program.

To achieve the abovementioned object, according to an aspect, an information processing apparatus that has an electronic mail function and is capable of operating in cooperation with a portable terminal, reflecting one aspect of the present invention comprises: a communication unit configured to perform a communication with the portable terminal; a terminal control unit configured to transmit a command of activating an address book application to the portable terminal through the communication unit in a case where the electronic mail function is selected, and to acquire a transmission destination address and a user address from the portable terminal; a mail creating unit configured to create an electronic mail in which the transmission destination address acquired by the terminal control unit is set to a transmission destination of the electronic mail, and the user address acquired by the terminal control unit to a transmission source of the electronic mail; an image acquiring unit configured to acquire an image to be transmitted with the electronic mail; and a mail transmitting unit configured to attach the image acquired by the image acquiring unit to the electronic mail created by the mail creating unit, and to transmit the electronic mail.

According to an invention of Item. 2, in the information processing apparatus of Item. 1, the information processing apparatus preferably further comprises: an image reading unit configured to read an original document to create image data, wherein the image acquiring unit acquires an image from the image reading unit.

According to an invention of Item. 3, in the information processing apparatus of Item. 1 or 2, the information processing apparatus preferably further comprises: a storage unit that stores an address book in which an electronic mail address capable of being selected as a transmission destination of the electronic mail is registered, wherein in a case where the electronic mail function is selected, the mail creating unit is capable of receiving a transmission destination address selecting operation performed by a user by reading and displaying an electronic mail address registered in the address book.

According to an invention of Item. 4, in the information processing apparatus of Item. 3, in a case where the electronic mail address registered in the address book is selected as a transmission destination address of the electronic mail by a user, the mail creating unit preferably further creates an electronic mail in which the transmission destination address selected by the user is set to the transmission destination of the electronic mail, and an electronic mail address of the information processing apparatus is set to the transmission source of the electronic mail.

According to an invention of Item. 5, in the information processing apparatus of Item. 3, in a case where the electronic mail address registered in the address book is selected as a transmission destination address of the electronic mail by a user, the mail creating unit preferably sets both of the transmission destination address acquired by the terminal control unit and the transmission destination address selected by the user as the transmission destination of the electronic mail, and sets any one of the user address acquired by the terminal control unit, and an electronic mail address of the information processing apparatus as the transmission source of the electronic mail.

According to an invention of Item. 6, in the information processing apparatus of Item. 4 or 5, in a case where the same address is included in the transmission destination address acquired by the terminal control unit, and the transmission destination address selected by the user, the mail creating unit preferably performs an alarm display with respect to the user, and deletes any one of the same address that is included in the transmission destination address acquired by the terminal control unit and the same address that is included in the transmission destination address selected by the user on the basis of a selection operation performed by the user.

According to an invention of Item. 7, in the information processing apparatus of any one of Items. 1 to 6, in a case where a plurality of user addresses are acquired from the portable terminal by the terminal control unit, the mail creating unit preferably displays the plurality of user addresses, and sets one user address as the transmission source of the electronic mail on the basis of a selection operation performed by a user.

According to an invention of Item. 8, in the information processing apparatus of Item. 7, when acquiring the user addresses from the portable terminal, the terminal control unit preferably further acquires account information of the user addresses, when displaying the plurality of user addresses acquired by the terminal control unit, the mail creating unit preferably analyzes each piece of account information of the plurality of user addresses, and displays the plurality of user addresses in priority that is determined in advance.

According to an invention of Item. 9, in the information processing apparatus of any one of Items. 1 to 8, the information processing apparatus preferably further comprises: an edition unit configured to edit addresses of the transmission destination and the transmission source of the electronic mail that is created by the mail creating unit on the basis of an operation performed by a user.

According to an invention of Item. 10, in the information processing apparatus of any one of Items. 1 to 9, after transmitting the command of activating the address book application to the portable terminal through the communication unit, the terminal control unit preferably displays an operation screen capable of being operated by a user on the basis of screen information that is received from the portable terminal, and transmits operation information to the portable terminal on the basis of an operation that is performed with respect to the operation screen by the user.

According to an invention of Item. 11, in the information processing apparatus of any one of Items. 1 to 9, the communication unit preferably communicates with a plurality of the portable terminals, in a case where the electronic mail function is selected in a state in which the communication unit communicates with the plurality of portable terminals, the terminal control unit preferably transmits the command of activating the address book application to each of the plurality of portable terminals through the communication unit, and acquires the transmission destination address and the user address from each of the plurality of portable terminals, the mail creating unit preferably sets the transmission destination address, which is acquired from one of the plurality of portable terminals by the terminal control unit, to the transmission destination of one electronic mail, and sets the user address, which is acquired from the one portable terminal by the terminal control unit, to the transmission source of the one electronic mail so as to create a plurality of electronic mails on the basis of the transmission destination address and the user address which are received from each of the plurality of portable terminals, and the mail transmitting unit preferably attaches the image acquired by the image acquiring unit to each of the plurality of electronic mails created by the mail creating unit, and transmits the electronic mail.

According to an invention of Item. 12, in the information processing apparatus of Item. 11, after transmitting the command of activating the address book application to each of the plurality of portable terminals through the communication unit, the terminal control unit preferably displays an operation screen capable of being operated by a user on the basis of screen information that is received from each of the plurality of portable terminals, and transmits operation information to each of the plurality of portable terminals on the basis of an operation that is performed with respect to the operation screen by the user.

To achieve the abovementioned object, according to an aspect, there is provided a non-transitory recording medium storing a computer readable program that is executed in an information processing apparatus that is capable of communicating with a portable terminal, and the program reflecting one aspect of the present invention causes the information processing apparatus to execute: a first step of transmitting a command of activating an address book application to the portable terminal in a case where an electronic mail function is selected, and of acquiring a transmission destination address and a user address from the portable terminal; a second step of creating an electronic mail in which the transmission destination address acquired in the first step is set to a transmission destination of the electronic mail, and the user address acquired in the first step is set to a transmission source of the electronic mail; a third step of acquiring an image to be transmitted with the electronic mail; and a fourth step of attaching the image acquired in the third step to the electronic mail created in the second step, and of transmitting the electronic mail.

To achieve the abovementioned object, according to an aspect, there is provided a non-transitory recording medium storing a computer readable program that is executed in a portable terminal that is capable of communicating with an information processing apparatus, and the program reflecting one aspect of the present invention causes the portable terminal to execute: a first step of activating an address book application when receiving a command of activating the address book application from the information processing apparatus, and of acquiring a transmission destination address of an electronic mail which is selected by a user, and a user address that is registered in the address book application from the address book application; and a second step of transmitting the transmission destination address and the user address, which are acquired in the first step, to the information processing apparatus.

According to an invention of Item. 15, in the non-transitory recording medium storing a computer readable program of Item. 14, in the first step, account information of the user address is preferably further acquired when acquiring the user address from the address book application, and in the second step, the user address and the account information, which are acquired in the first step, are preferably correlated with each other, and are transmitted to the information processing apparatus.

According to an invention of Item. 16, in the non-transitory recording medium storing a computer readable program of Item. 14 or 15, in the first step, after activating the address book application, screen information for selection of the transmission destination address of the electronic mail by a user is preferably acquired from the address book application, the screen information is preferably transmitted to the information processing apparatus, and operation information is preferably output to the address book application in a case where the operation information based on the screen information is received from the information processing apparatus.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a view illustrating a flow of respective processes in a cooperating operation between the information processing apparatus and the portable terminal;

FIG. 9 is a view illustrating an example of an electronic mail that is created on the basis of the address book of the information processing apparatus;

FIG. 10 is a view illustrating an example of an alarm screen that is displayed on an operation panel;

FIG. 15 is a view illustrating an example of history information that is recorded in the information processing apparatus;

DESCRIPTION OF THE PREFERRED EMBODIMENTS

Figure 1:
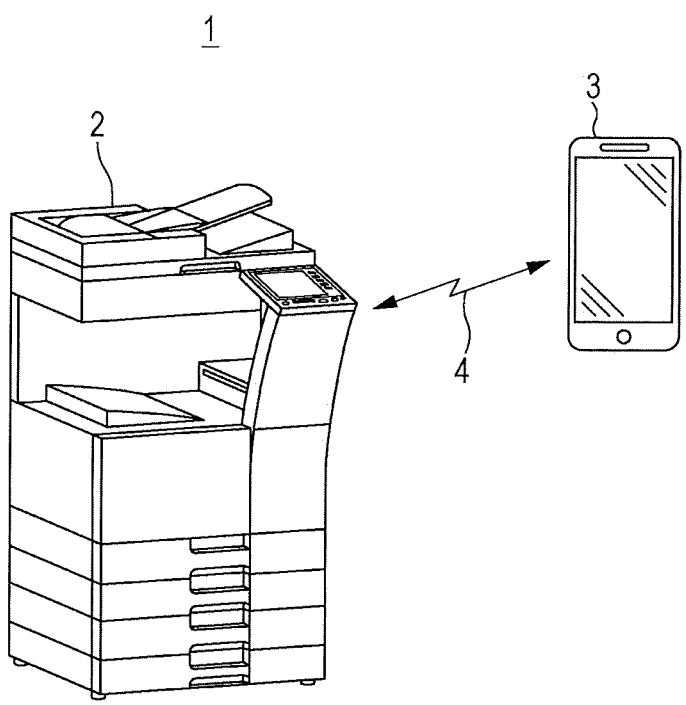
FIG. 1 is a view illustrating a configuration example of an information processing system.

Hereinafter, a preferred embodiment of the present invention will be described in detail with reference to the drawings. However, the scope of the invention is not limited to the illustrated examples. Note that, in the following embodiment, the same reference numeral will be given to common members, and redundant description thereof will not be repeated.

FIG. 1 is a view illustrating a configuration example of an information processing system 1 that is an embodiment of the invention. The information processing system 1 includes an information processing apparatus 2 that is constituted by an MFP and the like, a portable terminal 3 that is constituted by a smart phone, a tablet terminal, and the like, and is configured in such a manner that the above-described components establish a communication possible connection state 4 with each other and perform an operation in cooperation with each other. For example, the information processing apparatus 2 is an apparatus that is set in an office and the like, and is shared by a plurality of users. The portable terminal 3 is a user-dedicated apparatus that is used by one user. A communication type between the information processing apparatus 2 and the portable terminal 3 may be either a wired communication or a wireless communication. However, in this example, an exemplification is made for a case where the information processing apparatus 2 and the portable terminal 3 perform a wireless communication such as Bluetooth (registered trademark), WiFi, and near field communication (NFC). For example, as will be described later, a wireless communication interface, which becomes a base station of the wireless communication, is embedded in the information processing apparatus 2. When detecting the portable terminal 3 carried by a user in a predetermined distance range, the information processing apparatus 2 performs pairing with the portable terminal 3 to establish a communication possible connection state 4. On the other hand, one or a plurality of the portable terminals 3 may communicate with the information processing apparatus 2.

The information processing apparatus 2 has a plurality of functions such as a scanning function, a printing function, a network function, a FAX function, an electronic mail function, and a BOX function. Particularly, the information processing apparatus 2 can transmit image data that is created by reading an image of an original document with the scanning function, image data that is stored by the BOX function, image data that is acquired through a network, and the like to an outer side by using the electronic mail function. In addition, the information processing apparatus 2 stores a program for an operation in cooperation with the portable terminal 3 in advance.

On the other hand, in addition to a wireless communication function for a wireless communication with the information processing apparatus 2, the portable terminal 3 is provided with an electronic mail function for transmission and reception of an electronic mail in advance. Accordingly, an address book, in which an electronic mail address (hereinafter, referred to as "user address") of a user, an electronic mail address of a third party which is registered in advance by the user, and the like are recorded, is stored in the portable terminal 3. In addition, a cooperation program for an operation in cooperation with the information processing apparatus 2 is stored in the portable terminal 3 in advance. The portable terminal 3 activates a cooperation application by executing the cooperation program so as to perform an operation in cooperation with the information processing apparatus 2. On the other hand, the cooperation application may be activated when a user makes an instruction for execution of the cooperation program. In addition, the cooperation program may be automatically executed when power is supplied to the portable terminal 3, and may be resident in the portable terminal 3 in an activated state.

In the information processing system 1 as described above, when a user of the portable terminal 3 in which the cooperation application enters an activated state approaches the information processing apparatus 2, the portable terminal 3 enters a wireless communication range with the information processing apparatus 2, and the information processing apparatus 2 and the portable terminal 3 enter a state in which a communication therebetween is possible. According to this, a process for a cooperation operation starts in each of the information processing apparatus 2 and the portable terminal 3. In addition, in this example, when a user of the portable terminal 3 selects the electronic mail function of the information processing apparatus 2 by operating the information processing apparatus 2, the information processing apparatus 2 and the portable terminal 3 initiate automatic cooperation with each other to allow various processes to automatically proceed. According to this, operation load of the user is reduced.

Figure 2:
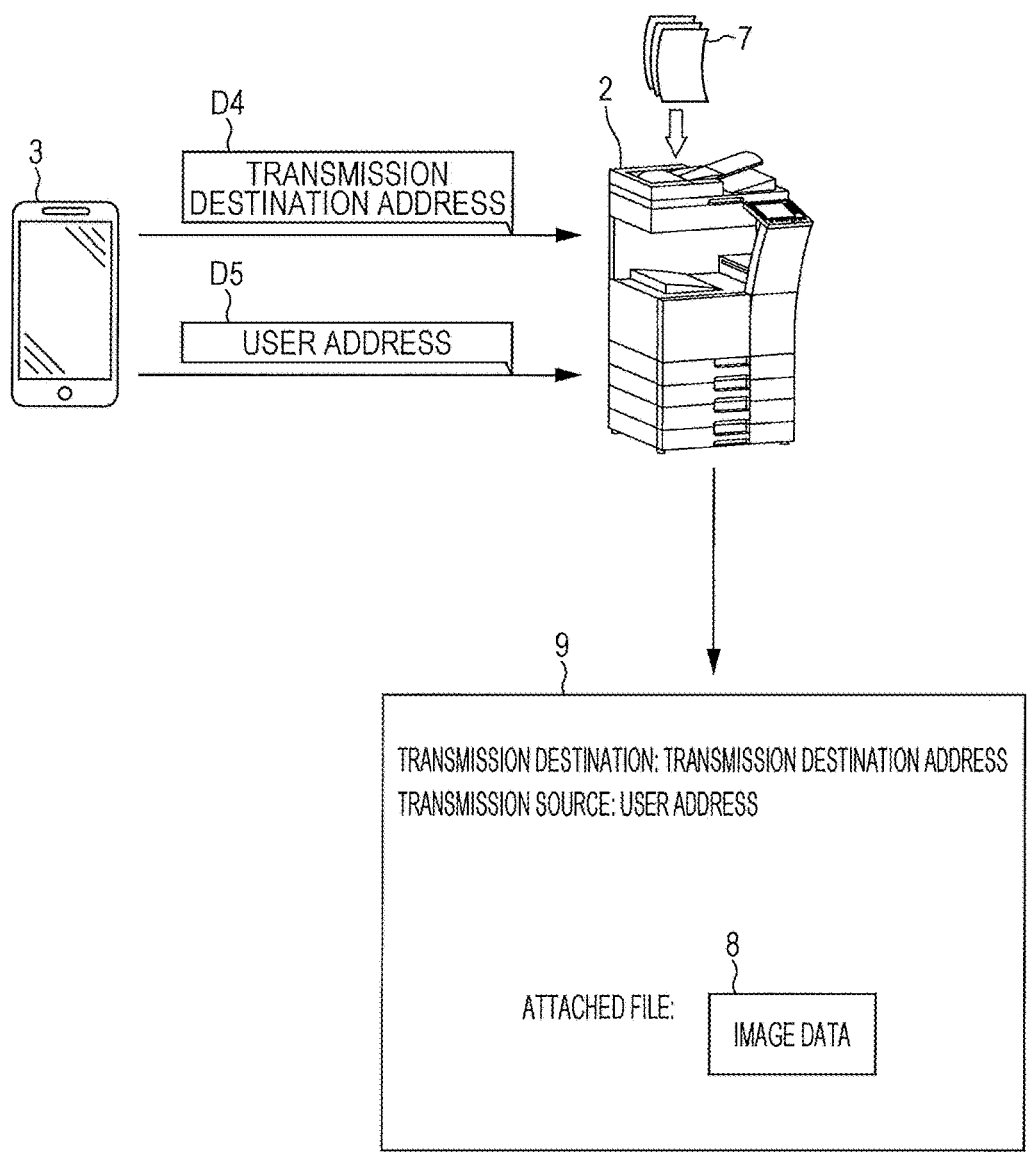
FIG. 2 is a view illustrating an overview of an operation in a case of transmitting image data, which is created with a scanning function of the information processing apparatus, in a state of being attached to an electronic mail.

FIG. 2 is a view illustrating an overview of an operation in a case of transmitting image data, which is created by the scanning function of the information processing apparatus 2, in a state of being attached to an electronic mail. When a cooperation operation with the portable terminal 3 is initiated, the information processing apparatus 2 activates an address book application that manages an address book in the portable terminal 3. According to this, in the portable terminal 3, an address selection screen by the address book application is automatically displayed. In addition, when a user performs an operation with respect to the address selection screen to select an electronic mail address that is a transmission destination of an electronic mail, the portable terminal 3 transmits the electronic mail address selected by the user to the information processing apparatus 2 as a transmission destination address D4. In addition, when transmitting the transmission destination address D4, the portable terminal 3 reads out a user address D5 from the address book, and transmits the user address D5 to the information processing apparatus 2. According to this, the information processing apparatus 2 acquires the transmission destination address D4 and the user address D5 from the portable terminal 3. In addition, the information processing apparatus 2 automatically creates an electronic mail 9 in which the transmission destination address D4, which is acquired from the portable terminal 3, is set to a transmission destination of an electronic mail 9, and the user address D5, which is acquired from the portable terminal 3, is set to a transmission source of the electronic mail 9. In addition, information processing apparatus 2 automatically attaches image data 8, which is created by reading an original document 7 with the scanning function, to the electronic mail 9 as an attached file. Then, the information processing apparatus 2 transmits the electronic mail 9 through an external mail server that is designated in advance. According to this transmission type, a user can perform transmission in a state in which a user address of the user which is registered in the portable terminal 3 is set to the transmission source address of the electronic mail 9, and thus a receiver of the electronic mail 9 can determine a transmitter of the mail. In addition, when the receiver of the electronic mail 9 performs a reply operation directly with respect to the received electronic mail 9, a reply mail is carried to the portable terminal 3. Accordingly, the receiver of the electronic mail 9 can perform an appropriate reply with respect to the user who transmits the electronic mail 9. Hereinafter, the information processing system 1 will be described in detail.

Figure 3:
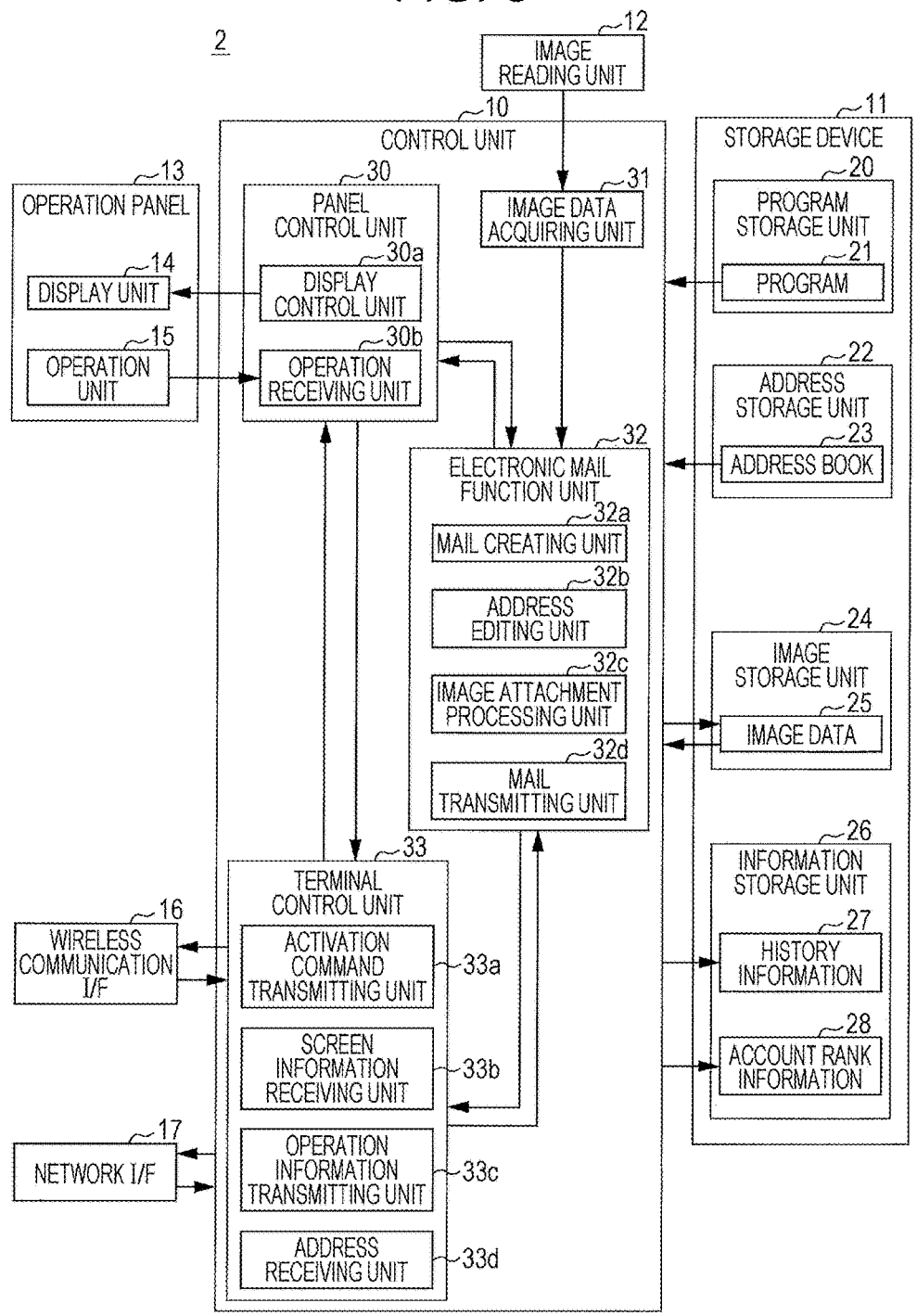
FIG. 3 is a block diagram illustrating an example of a hardware configuration and a functional configuration of the information processing apparatus.

First, description will be given of a configuration of the information processing apparatus 2. FIG. 3 is a block diagram illustrating an example of a hardware configuration and a functional configuration of the information processing apparatus 2. As the hardware configuration as illustrated in FIG. 3, the information processing apparatus 2 includes a control unit 10 that includes a CPU and a memory, a non-volatile storage device 11 that is constituted by a hard disk drive (HDD), a semiconductor memory, and the like, an image reading unit 12 that optically reads an image of an original document to create image data, an operation panel 13 that becomes a user interface when a user operates the information processing apparatus 2, a wireless communication interface 16 for performing a wireless communication with the portable terminal 3, and a network interface 17 that connects the information processing apparatus 2 to a network such as a local area network (LAN). On the other hand, in addition to above-described components, the information processing apparatus 2 includes a printer unit for print out, a FAX unit for transmission and reception of FAX data, and the like, but these components are not illustrated.

The wireless communication interface 16 is an interface that performs a wireless communication with the portable terminal 3. For example, the wireless communication interface 16 always emits electronic waves into a predetermined range in the vicinity of the information processing apparatus 2. When detecting existence of the portable terminal 3 in the predetermined range, the wireless communication interface 16 notifies the control unit 10 of the existence of the portable terminal 3. Furthermore, the wireless communication interface 16 may perform the wireless communication with one or a plurality of the portable terminals 3.

The operation panel 13 includes a display unit 14 that displays various pieces of information, and an operation unit 15 to which a user can perform an operational input. For example, the display unit 14 is constituted by a color liquid crystal display and the like, and can display various screens. For example, the operation unit 15 is constituted by a touch panel sensor that is disposed on a screen of the display unit 14, and the like, and can detect various operations such as a touch operation that is performed by a user with respect to the screen.

A program storage unit 20, an address storage unit 22, an image storage unit 24, and an information storage unit 26 are installed in the storage device 11. The program storage unit 20 is a storage region that stores a program 21 that is executed by the CPU of the control unit 10 is stored. The address storage unit 22 is a storage region that stores an address book 23 in which an electronic mail address registered by a manager is recorded. In addition to the electronic mail address of the information processing apparatus 2, various electronic mail addresses capable of being selected as a transmission destination of an electronic mail are recorded in the address book 23. The image storage unit 24 is a storage region that stores image data 25 that is managed with the BOX function. The image data 25, which is stored in the image storage unit 24, may be created by the image reading unit 12, or may be received from an external device through the wireless communication interface 16 or the network interface 17. The information storage unit 26 is a storage region that stores history information 27 in which a job execution history in the information processing apparatus 2 is recorded, or account rank information 28 in which various electronic mail accounts are ranked.

When power is supplied to the information processing apparatus 2, the CPU of the control unit 10 functions as various processing units by reading out the program 21 from the program storage unit 20 and executing the program 21, and controls operations of respective units. Particularly, as illustrated in FIG. 3, the control unit 10 of this embodiment functions as a panel control unit 30, an image data acquiring unit 31, an electronic mail function unit 32, and a terminal control unit 33.

The panel control unit 30 includes a display control unit 30a and an operation receiving unit 30b. The display control unit 30a controls an operation screen that is displayed on the display unit 14 of the operation panel 13 and is capable of being operated by a user. In a case where the operation unit 15 is operated by a user, the operation receiving unit 30b receives the operation, creates operation information based on the operation by the user, and outputs the operation information. For example, in a case of acquiring an address selection screen from the electronic mail function unit 32, the display control unit 30a displays the address selection screen on the display unit 14. In addition, in a case of acquiring screen information from the terminal control unit 33, the display control unit 30a displays the operation screen on the display unit 14 on the basis of the screen information. In a case where the operation information based on the operation by the user is created when the address selection screen output from the electronic mail function unit 32 is displayed on the display unit 14, the operation receiving unit 30b outputs the operation information to the electronic mail function unit 32. In addition, in a case where the operation information based on the operation by the user is created when the operation screen based on the screen information output from the terminal control unit 33 is displayed on the display unit 14, the operation receiving unit 30b outputs the operation information to the terminal control unit 33.

The image data acquiring unit 31 acquires the image data 8 that is transmitted by an electronic mail transmitting function. For example, in a case where "Scan to E-mail" is selected by a user, and the image data 8 created by reading an image of the original document 7 is transmitted with the electronic mail 9, the image data acquiring unit 31 acquires the image data 8 output from the image reading unit 12 as the image data 8 that is a transmission object. However, there is no limitation thereto, and the image data acquiring unit 31 may acquire the image data 8, which is a transmission object, through the network interface 17. In addition, the image data 25, which is stored in the image storage unit 24, may be acquired as the image data 8 that is a transmission object. In addition, the image data acquiring unit 31 temporarily stores the image data 8, which is acquired as the transmission object, in the memory and the like.

The electronic mail function unit 32 is a processing unit that transmits an electronic mail from the information processing apparatus 2, and operates in a case where the electronic mail function is selected by a user. When initiating an operation, the electronic mail function unit 32 reads out the address book 23 from the address storage unit 22, creates an address selection screen, and outputs the address selection screen to the panel control unit 30. According to this, a list of electronic mail addresses, which are registered in the address book 23 of the information processing apparatus 2, is displayed on the display unit 14 of the operation panel 13. In addition, when acquiring operation information with respect to an address selection screen from the panel control unit 30, the electronic mail function unit 32 extracts a transmission destination address, which becomes a transmission destination of an electronic mail, from the electronic mail address registered in the address book 23 on the basis of an operation by a user.

In addition, the electronic mail function unit 32 can automatically create the electronic mail 9 as illustrated in FIG. 2 in cooperation with the terminal control unit 33. As a configuration for this, the electronic mail function unit 32 includes a mail creating unit 32a, an address editing unit 32b, an image attachment processing unit 32c, and a mail transmitting unit 32d. Details of the respective units will be described later.

The terminal control unit 33 performs an operation in cooperation with the portable terminal 3. The terminal control unit 33 always monitors whether or not the portable terminal 3 capable of performing a communication through the wireless communication interface 16 exists. When detecting existence of the portable terminal 3 capable of performing a communication, the terminal control unit 33 performs a pairing process with the portable terminal 3 to automatically establish a connection state 4 capable of communicating with the portable terminal 3. At this time, the terminal control unit 33 acquires terminal information from the portable terminal 3 that becomes a communication partner, and manages the communication partner by using the terminal information. In addition, when the electronic mail function is selected by a user and an operation of the electronic mail function unit 32 starts, the terminal control unit 33 initiates a cooperation process with the portable terminal 3. The terminal control unit 33 includes an activation command transmitting unit 33a, a screen information receiving unit 33b, an operation information transmitting unit 33c, and an address receiving unit 33d so as to perform the cooperation process with the portable terminal 3.

The activation command transmitting unit 33a is a processing unit that transmits a command of activating the address book application to the portable terminal 3 in a case where the electronic mail function is selected by a user. When the activation command transmitting unit 33a transmits the activation command, the address book application can be automatically activated in the portable terminal 3. Accordingly, after selecting the electronic mail function by operating the operation panel 13, when the user takes out the portable terminal 3 and confirms a display screen thereof, the address selection screen by the address book application enters an automatically displayed state. Accordingly, the user can quickly initiate an address selection operation of designating a transmission destination of the electronic mail.

In addition, in this embodiment, when the address book application is activated in the portable terminal 3, screen information corresponding to the address selection screen, which is displayed by the address book application, is transmitted from the portable terminal 3 to the information processing apparatus 2. The screen information receiving unit 33b is a processing unit that receives the screen information from the portable terminal 3. When receiving the screen information from the portable terminal 3, the screen information receiving unit 33b outputs the screen information to the panel control unit 30. In addition, the display control unit 30a displays the operation screen, which is based on the screen information output from the screen information receiving unit 33b, on the display unit 14. According to this, the address selection screen, which is displayed on the display unit 14 of the operation panel 13, is changed from a screen created on the basis of the address book 23 of the information processing apparatus 2 to the address selection screen that is displayed in the portable terminal 3. Accordingly, even not taking out the portable terminal 3, the user can perform an address selection operation with respect to the portable terminal 3 by performing an operation with respect to a screen that is switched and displayed on the operation panel 13. As a result, convenience is further improved.

If the operation receiving unit 30b of the panel control unit 30 detects an operation by a user when the operation screen based on the screen information received from the portable terminal 3 is displayed on the display unit 14, the operation receiving unit 30b creates operation information including position coordinates of the operation by the user, and outputs the operation information to the terminal control unit 33. The operation information transmitting unit 33c of the terminal control unit 33 is a processing unit that functions in a case of acquiring the operation information from the panel control unit 30, and transmits the operation information to the portable terminal 3. According to this, the portable terminal 3 can acquire the operation information with respect to the address selection screen, which is displayed by the address book application, from the information processing apparatus 2, and can specify a transmission destination address selected by the user among a plurality of electronic mail addresses, which are displayed on the address selection screen, on the basis of the operation information. In addition, the portable terminal 3 transmits the transmission destination address D4 that is specified, and the user address D5 to the information processing apparatus 2.

The address receiving unit 33d is a processing unit that receives the transmission destination address D4 and the user address D5 from the portable terminal 3. When receiving the transmission destination address D4 and the user address D5, the address receiving unit 33d outputs the addresses to the electronic mail function unit 32.

When acquiring the transmission destination address D4 and the user address D5 from the terminal control unit 33, the electronic mail function unit 32 automatically creates the electronic mail 9. The mail creating unit 32a is a processing unit that creates the electronic mail 9, and automatically creates the electronic mail 9 in which the transmission destination address D4 acquired by the terminal control unit 33 is set to a transmission destination of the electronic mail 9, and the user address D5 acquired by the terminal control unit 33 is set to a transmission source of the electronic mail 9.

The address editing unit 32b receives an edition operation by a user with respect to an address that is set to the transmission destination or the transmission source of the electronic mail 9 created by the mail creating unit 32a, and performs an edition process such as addition, changing, or deletion of the electronic mail address on the basis of the edition operation. Accordingly, the user can perform an operation of adding an electronic mail address that is not registered in the portable terminal 3 to the transmission destination, an operation of deleting an electronic mail address that is erroneously designated as the transmission destination, and the like by operating the operation panel 13. For example, when adding an electronic mail address, which is not registered in the portable terminal 3, to the transmission destination, the address editing unit 32b can allow an address selection screen based on the address book 23 of the address storage unit 22 to be displayed on the operation panel 13, and can add an electronic mail address registered in the information processing apparatus 2 on the basis of an address selection operation by the user.

The image attachment processing unit 32c is a processing unit that receives the image data 8 that is acquired by the image data acquiring unit 31, and attaches the image data 8 to the electronic mail 9. When attaching the image data 8 to the electronic mail 9, the image attachment processing unit 32c can change a data format of the image data 8 to a predetermined format.

The mail transmitting unit 32d functions in a case where an instruction of transmitting the electronic mail 9 is given by a user, and transmits the electronic mail 9 to which the image data 8 is attached. The mail transmitting unit 32d transmits the electronic mail 9 to an external mail server that is set in advance by a manager. According to this, the electronic mail 9 is transmitted to the transmission destination address through the external mail server that is designated by the manager. In addition, when the process of transmitting the electronic mail 9 is completed, the electronic mail function unit 32 creates information indicating a transmission history, and records the transmission history in the history information 27.

Figure 4:
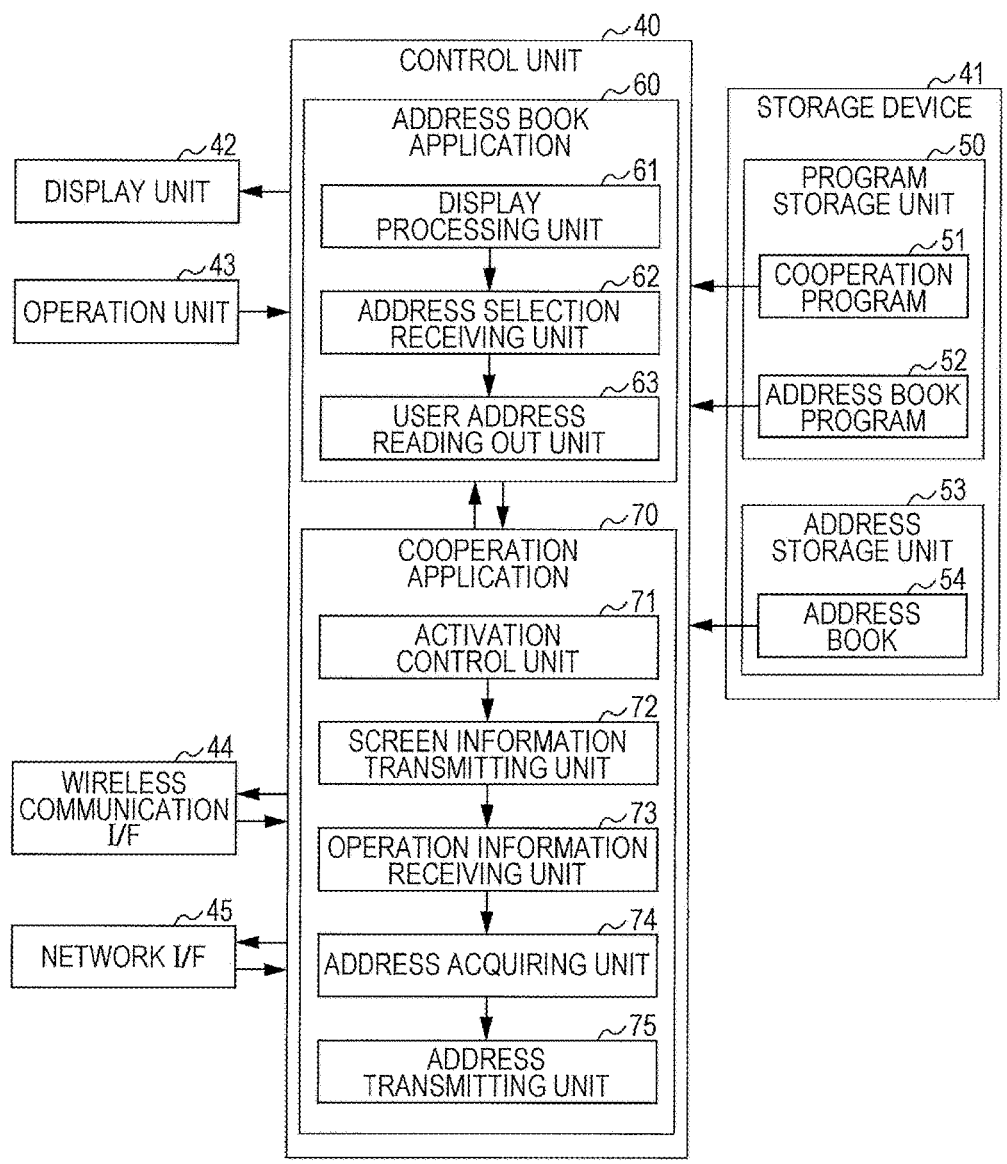
FIG. 4 is a block diagram illustrating an example of a hardware configuration and a functional configuration of a portable terminal.

Next, description will be given of a configuration of the portable terminal 3. FIG. 4 is a block diagram illustrating an example of a hardware configuration and a functional configuration of the portable terminal 3. As the hardware configuration as illustrated in FIG. 4, the portable terminal 3 includes a control unit 40 that includes a CPU and a memory, a non-volatile storage device 41 that is constituted by a solid state drive (SSD) and the like, a display unit 42 that is constituted by a color liquid display and the like, an operation unit 43 that is constituted by a touch panel sensor disposed on a screen of the display unit 42, and the like, a wireless communication interface 44, and a network interface 45 that is connected to a network such as a LAN.

The wireless communication interface 44 is an interface that performs a wireless communication with the information processing apparatus 2. For example, when detecting electronic waves emitted from the information processing apparatus 2, the wireless communication interface 44 notifies the control unit 40 of a state of capable of communicating with the information processing apparatus 2, and initiates a communication with the information processing apparatus 2 on the basis of an instruction from the control unit 40. Furthermore, the wireless communication interface 44 may perform a wireless communication with one information processing apparatus 2.

A program storage unit 50 and an address storage unit 53 are installed in the storage device 41. The program storage unit 50 is a storage region that stores various programs which are executed by the CPU of the control unit 40. For example, a cooperation program 51 that performs an operation in cooperation with the information processing apparatus 2, and an address book program 52 that operates an address book application 60 are stored in advance in the program storage unit 50. Furthermore, although not illustrated, an operating system, which is a basic program of the portable terminal 3, is also stored in the program storage unit 50. The address storage unit 53 is a storage region that stores an address book 54 in which an electronic mail address registered in advance by a user is recorded. The address book 54 is managed by an address book application 60.

The CPU of the control unit 40 functions as various processing units by reading out and executing various programs from the program storage unit 50, and controls operations of respective units. For example, the control unit 40 activates the operating system in accordance of supply of power to the portable terminal 3. According to this, the CPU of the control unit 40 enters a state capable of executing the cooperation program 51 and the address book program 52. In addition, in this example, when the CPU executes the cooperation program 51, the control unit 40 functions as a cooperation application 70. In addition, when the CPU executes the address book program 52, the control unit 40 functions as the address book application 60. The cooperation application 70 and the address book application 60 can be simultaneously activated in the control unit 40, and can perform an operation in cooperation with each other. For example, the cooperation application 70 outputs a command to the address book application 60 through the operating system, and the address book application 60 performs a process corresponding to the command. In addition, the address book application 60 outputs necessary information to the cooperation application 70 through the operating system to perform an operation in cooperation with each other.

The portable terminal 3 establishes a state capable of performing a communication with the information processing apparatus 2 in a state in which the cooperation application 70 is activated in the control unit 40. That is, when detecting that a communication with the information processing apparatus 2 is possible by the wireless communication interface 44, the cooperation application 70 performs a pairing process with the information processing apparatus 2 to establish a connection state 4 capable of communicating with the information processing apparatus 2. The cooperation application 70 includes an activation control unit 71, a screen information transmitting unit 72, an operation information receiving unit 73, an address acquiring unit 74, and an address transmitting unit 75. When a pairing process with the information processing apparatus 2 is terminated, and a communication possible state is established, the respective units operate.

The activation control unit 71 operates when receiving a command of activating the address book application 60 from the information processing apparatus 2, and gives an instruction for the operating system to execute the address book program 52 so as to perform a process of activating the address book application 60 in the control unit 40. Furthermore, in a state in which the address book application 60 is activated already when receiving the activation command from the information processing apparatus 2, it is not necessary for the activation control unit 71 to activate the address book application 60.

The address book application 60 includes a display processing unit 61, an address selection receiving unit 62, and a user address reading unit 63. When the address book application 60 is activated in the control unit 40, first, the display processing unit 61 functions. The display processing unit 61 reads out the address book 54 from the address storage unit 53, and displays an address selection screen on the display unit 42 on the basis of an electronic mail address that is registered in the address book 54. According to this, a user can select a transmission destination address of the electronic mail 9 by operating the operation unit 43.

In addition, the display processing unit 61 creates screen information in which the address selection screen to be displayed on the display unit 42 is converted into a bit map, and outputs the screen information to the cooperation application 70. When acquiring the screen information from the address book application 60, the cooperation application 70 allows the screen information transmitting unit 72 to function. The screen information transmitting unit 72 transmits the screen information, which is acquired from the address book application 60, to the information processing apparatus 2. According to this, a screen such as the address selection screen displayed on the display unit 42 is displayed in the information processing apparatus 2.

In addition, the cooperation application 70 allows the operation information receiving unit 73 to function. The operation information receiving unit 73 receives operation information that is transmitted from the information processing apparatus 2, and outputs the operation information to the address book application 60. According to this, the address book application 60 can acquire operation information with respect to an address selection screen that is displayed on the display unit 42 from the cooperation application 70.

When acquiring the operation information from the cooperation application 70, the address book application 60 allows the address selection receiving unit 62 to function. The address selection receiving unit 62 is a processing unit that receives an address selection operation by a user. When acquiring the operation information from the cooperation application 70, the address selection receiving unit 62 specifies a position of an operation that is performed by a user with respect to the address selection screen on the basis of operation position coordinates included in the operation information, and extracts an electronic mail address selected by a user from the address book 54 on the basis of the operation position. In addition, in a case where a user performs an address selection operation with respect to the operation unit 43, the address selection receiving unit 62 can also extract an electronic mail address selected by the user from the address book 54 on the basis of the address selection operation. In addition, the address selection receiving unit 62 outputs the electronic mail address, which is extracted from the address book 54, to the cooperation application 70 as a transmission destination address. Furthermore, the address selection receiving unit 62 may extract a plurality of electronic mail addresses as the transmission destination address.

In addition, the user address reading unit 63 reads out a user address of the user of the portable terminal 3 from the address book 54, and outputs the user address to the cooperation application 70. When reading out the user address, the user address reading unit 63 simultaneously reads out account information that is correlated to the user address. The account information includes information related to the electronic mail account of mail server and the like. In addition, the user address reading unit 63 outputs the account information to the cooperation application 70 in combination with the user address.

In addition, in the cooperation application 70, the address acquiring unit 74 and the address transmitting unit 75 sequentially function. The address acquiring unit 74 acquires the transmission destination address, the user address, and the account information which are output from the address book application 60. In addition, the address transmitting unit 75 transmits the transmission destination address, the user address, and the account information, which are acquired by the address acquiring unit 74, to the information processing apparatus 2.

FIG. 5 is a view illustrating respective processes of the cooperation operation between the information processing apparatus 2 and the portable terminal 3. Furthermore, FIG. 5 also illustrates a flow of respective processes in a case of transmitting image data, which is created by reading an image of an original document with the scanning function through an operation of the information processing apparatus 2 by a user, with an electronic mail.

First, when detecting the portable terminal 3, in which the cooperation application 70 is activated, in a wireless communication possible range, the information processing apparatus 2 performs a pairing process with the portable terminal 3, and establishes a connection state capable of communicating with the portable terminal 3 (process P1). Then, when the user operates the information processing apparatus 2 to log on in the information processing apparatus 2, and selects the electronic mail function of the information processing apparatus 2 (process P2), the information processing apparatus 2 transmits an activation command D1 of the address book application 60 to the portable terminal 3 (process P3). According to this, the portable terminal 3 activates the address book application 60 (process P4) to display the address selection screen on the basis of the electronic mail address registered in the address book 54 of the portable terminal 3 (process P5). In addition, the portable terminal 3 creates screen information D2 corresponding to the address selection screen (process P6), and transmits the screen information D2 to the information processing apparatus 2 (process P7).

When receiving the screen information D2 from the portable terminal 3, the information processing apparatus 2 displays a screen such as the address selection screen, which is displayed in the portable terminal 3, on the display unit 14 of the operation panel 13 on the basis of the screen information D2.

Figure 6A:
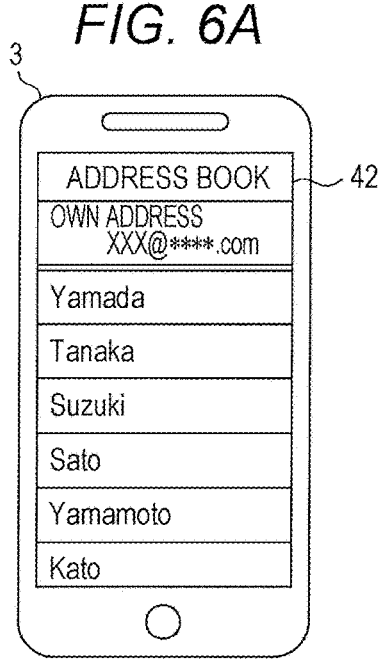
FIGS. 6A and 6B are views illustrating an example of a screen that is displayed in the portable terminal and the information processing apparatus.
Figure 6B:
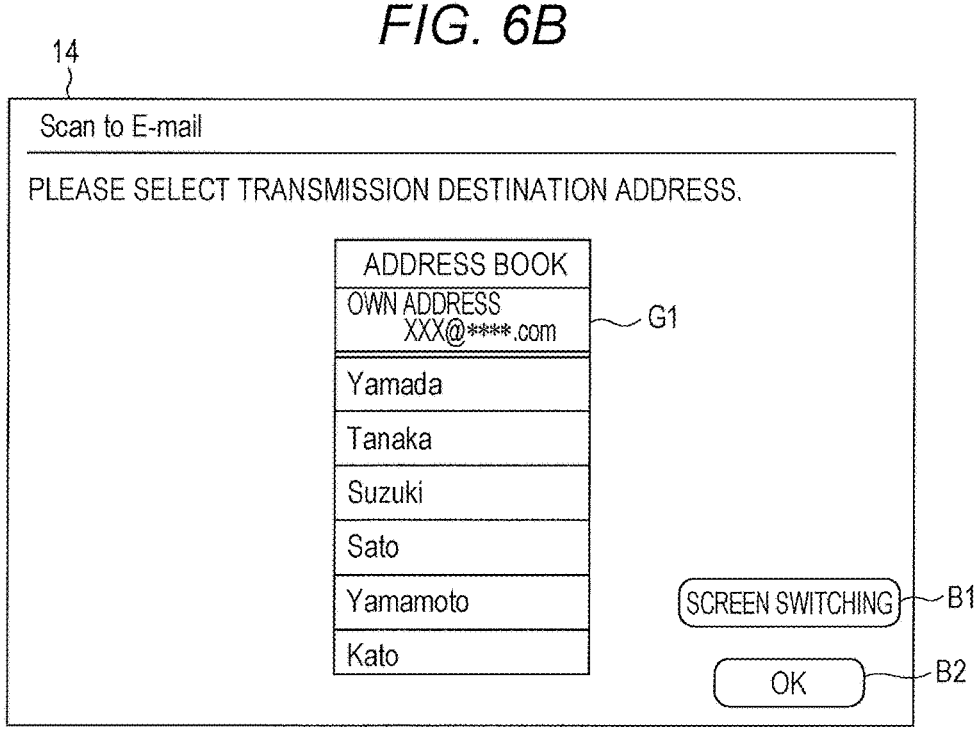

FIGS. 6A and 6B are views illustrating an example of a screen that is displayed in the portable terminal 3 and the information processing apparatus 2. When the address book application 60 is activated in the portable terminal 3, an address selection screen as illustrated in FIG. 6A is displayed on the display unit 42 of the portable terminal 3. On the other hand, the information processing apparatus 2 receives screen information corresponding to the address selection screen from the portable terminal 3, and displays an operation screen as illustrated in FIG. 6B on the display unit 14. The operation screen includes the same screen image G1 as in the address selection screen displayed in the portable terminal 3, and a user can select a transmission destination address by performing an operation with respect to the screen image G1. In addition, in addition to the screen image G1, a screen switching button B1 or an OK button B2 that is used by the user to confirm an address selection operation is also displayed on the display unit 14. The screen switching button B1 is a button that is used by a user to switch the address selection screen displayed on the display unit 14. That is, when the screen switching button B1 is operated by the user, the address selection screen that is displayed on the display unit 14 is switched to a screen on which a transmission destination address from the address book 23 of the information processing apparatus 2 is selected.

Figure 7:
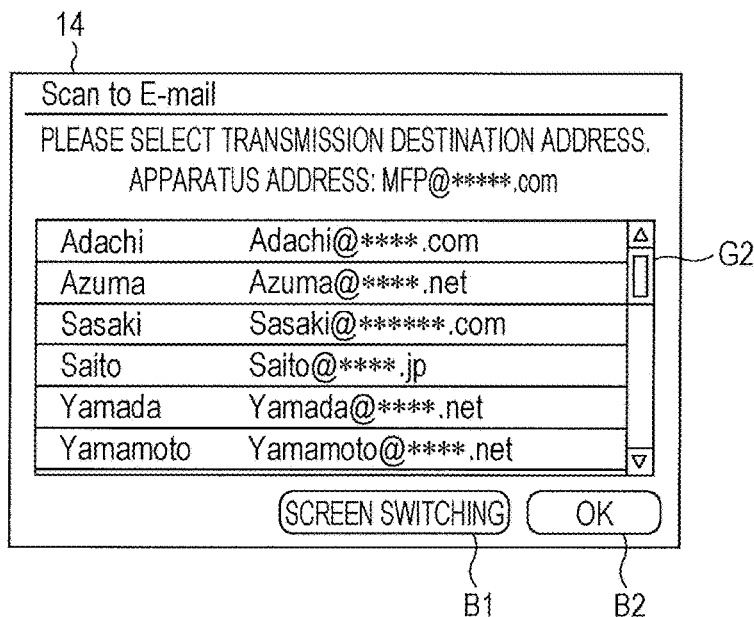
FIG. 7 is a view illustrating an example of an address selection screen on the basis of an address book of the information processing apparatus.

FIG. 7 is a view illustrating an example of the address selection screen based on the address book 23 of the information processing apparatus 2. An address selection column G2 based on the address book 23 of the information processing apparatus 2 is displayed on the screen illustrated in FIG. 7. Accordingly, when the screen is displayed, the user can select the transmission destination address from the address book 23 of the information processing apparatus 2. In addition, as is the case with the screen illustrated in FIG. 6B, the screen switching button B1 and the OK button B2 are displayed on the screen. Accordingly, the user can select the transmission destination address from both of the address book 54 of the portable terminal 3 and the address book 23 of the information processing apparatus 2 by operating the screen switching button B1 to switch the address selection screen. In addition, when the OK button B2 is operated by the user, a state of receiving the address selection operation of the user is terminated.

Returning to FIG. 5, when detecting an operation by the user when displaying the operation screen based on the screen information D2 received from the portable terminal 3 (process P9), the information processing apparatus 2 transmits operation information D3 based on the operation to the portable terminal 3 (process P10). When receiving the operation information D3, the portable terminal 3 extracts transmission destination address D4 from the address book 54 on the basis of the operation information D3 (process p11), and transmits the transmission destination address D4 to the information processing apparatus 2 (process P12). In addition, the information processing apparatus 2 sets the transmission destination address D4, which is received from the portable terminal 3, to a transmission destination of the electronic mail 9 (process P13). In addition, the portable terminal 3 reads out a user address D5 from the address book 54 (process P14), and transmits the user address D5 to the information processing apparatus 2 in combination with the account information (process P15). In addition, the information processing apparatus 2 sets the user address D5, which is received from the portable terminal 3, to a transmission source of the electronic mail 9 (process P16).

Figure 8:
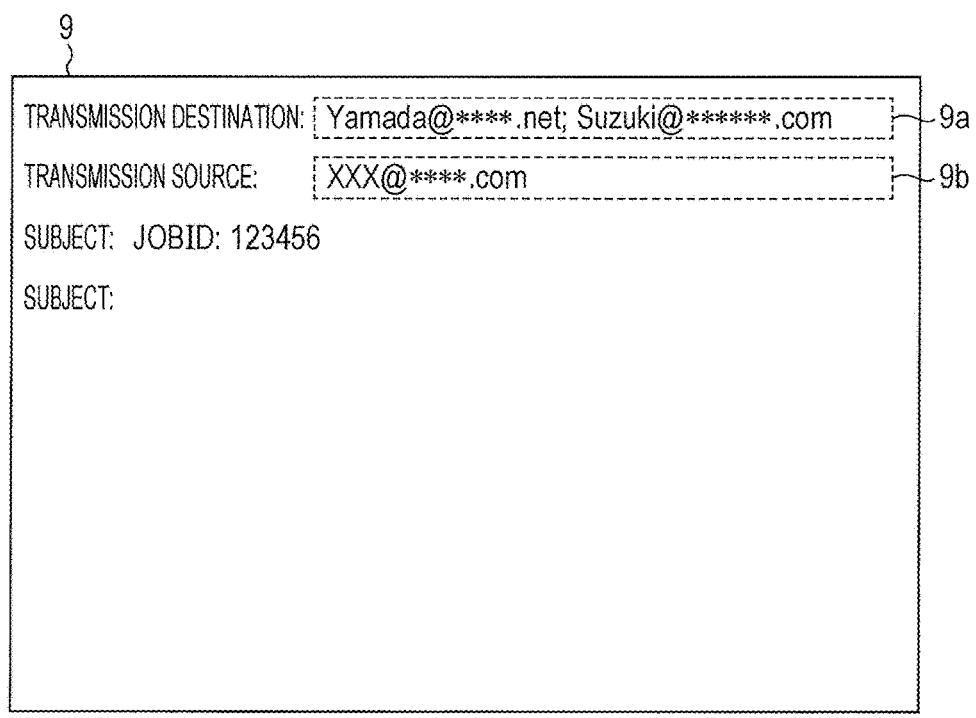
FIG. 8 is a view illustrating an example of an electronic mail that is created in the information processing apparatus.

FIG. 8 is a view illustrating an example of the electronic mail 9 that is created as described above. As illustrated in FIG. 8, in a transmission destination address column 9a of the electronic mail 9, the electronic mail address selected from the address book 54 of the portable terminal 3 by the user is set as the transmission destination address. In a transmission source address column 9b, the user address registered in the portable terminal 3 is set as the transmission source address.

In addition, the information processing apparatus 2 executes a process of reading the original document 7 with the scanning function on the basis of a reading initiation instruction made by the user (process P17), and attaches the image data 8, which is created by the process, to the electronic mail 9 (process P18). That is, here, the image data 8, which is created by reading the original document 7, is attached to the electronic mail 9 as illustrated in FIG. 7 as an attached file. Then, the information processing apparatus 2 executes a process of transmitting the electronic mail 9 (process P19), and updates the history information 27 when the transmission process is terminated (process P20).

In this example, as described above, it is possible to select the transmission destination address from both of the address book 54 of the portable terminal 3 and the address book 23 of the information processing apparatus 2. In a case where the user selects the transmission destination address from both of the address book 54 of the portable terminal 3 and the address book 23 of the information processing apparatus 2, the information processing apparatus 2 may create two electronic mails 9 or may create one electronic mail 9.

For example, in a case of creating the two electronic mails 9, the information processing apparatus 2 sets a transmission destination address selected from the address book 54 of the portable terminal 3 to a transmission destination of a first electronic mail 9, and sets a user address of the portable terminal 3 to a transmission source. In addition, the information processing apparatus 2 sets a transmission destination address selected from the address book 23 of the information processing apparatus 2 to a transmission destination of a second electronic mail 9, and sets an electronic mail address of the information processing apparatus 2 to a transmission source. In this case, the first electronic mail 9 becomes an electronic mail 9 as illustrated in FIG. 8. In addition, the second electronic mail 9 becomes an electronic mail 9 as illustrated in FIG. 9. That is, as illustrated in FIG. 9, in the second electronic mail 9, the electronic mail address selected by the user from the address book 23 of the information processing apparatus 2 is set as the transmission destination address in the transmission destination address column 9a, and the electronic mail address of the information processing apparatus 2 is set as the transmission source address in the transmission source address column 9b. In addition, the information processing apparatus 2 attaches the image data 8, which is created by performing an operation of reading the original document 7 with the scanning function once, to each of the two electronic mails 9, and transmits the electronic mails 9.

In addition, the electronic mail address registered in the address book 23 of the information processing apparatus 2 may also be registered in the address book 54 of the portable terminal 3 in some cases. In these cases, when the user selects the transmission destination address from each of the address book 23 of the information processing apparatus 2 and the address book 54 of the portable terminal 3, the transmission destination address selected from the address book 23 of the information processing apparatus 2, and the transmission destination address selected from the address book 54 of the portable terminal 3 may duplicate with each other. If the same electronic mail address is included in the transmission destination of the two electronic mails 9, the two electronic mails 9, to which the same image data 8 is attached, may be transmitted to the same transmission destination. To prevent this situation, in a case where the user selects the transmission destination address from each of the address book 23 of the information processing apparatus 2 and the address book 54 of the portable terminal 3, the mail creating unit 32a of the information processing apparatus 2 determines whether or not the same address is included in the transmission destination address selected from the address book 23 of the information processing apparatus 2 and the transmission destination address selected from the address book 54 of the portable terminal 3. In a case where the same address is included in the transmission destination addresses, the mail creating unit 32a performs an alarm display on the display unit 14 with respect to the user.

FIG. 10 is a view illustrating an example of an alarm screen displayed on the display unit 14. The alarm screen includes an alarm message of warning a user of duplication of the transmission destination addresses, and is constituted by a screen of urging the user to delete any one of the transmission destination addresses. That is, a button B3 that is used to delete an address selected from the address book 54 of the portable terminal 3, and a button B4 that is used to delete an address selected from the address book 23 of the information processing apparatus 2 are displayed on the alarm screen, and the user can operate any one of the button B3 and the button B4. In addition, in a case where the button B3 is operated by the user, the mail creating unit 32a deletes an address that duplicates with the transmission destination address, which is selected from the address book 23 of the information processing apparatus 2, from the transmission destination address selected from the address book 54 of the portable terminal 3. In addition, in a case where the button B4 is operated by the user, the mail creating unit 32a deletes an address that duplicates with the transmission destination address, which is selected from the address book 54 of the portable terminal 3, from the transmission destination address selected from the address book 23 of the information processing apparatus 2.

In contrast, in a case of creating the one electronic mail 9, the information processing apparatus 2 merges the transmission destination address selected from the address book 54 of the portable terminal 3, and the transmission destination address selected from the address book 23 of the information processing apparatus 2, and sets the merged transmission destination address to the transmission destination of the one electronic mail 9. In addition, the information processing apparatus 2 sets any one of the user address acquired from the portable terminal 3 and the electronic mail address of the information processing apparatus 2 as the transmission source of the one electronic mail 9. At this time, the mail creating unit 32a displays an operation screen, on which the user can select setting of either the user address acquired from the portable terminal 3 or the electronic mail address of the information processing apparatus 2 to the transmission source, on the display unit 14.

Figure 11A:
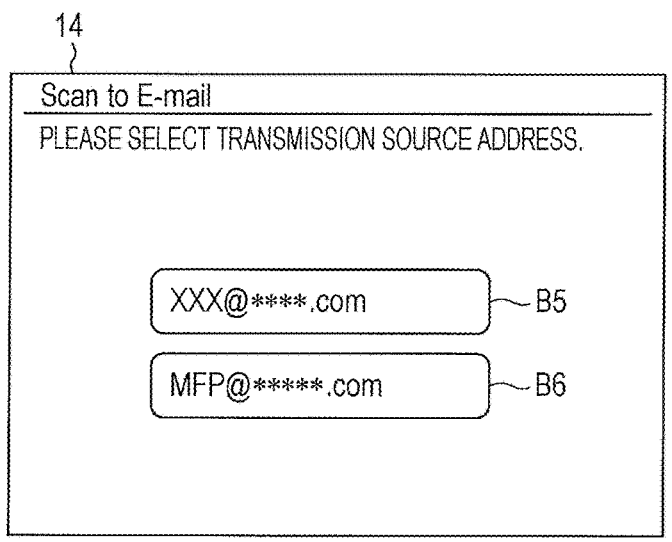
FIGS. 11A and 11B are views illustrating an example of an operation screen capable of selecting a transmission source address, and an electronic mail.

FIG. 11A illustrates an example of the operation screen on which the user can make a selection. A button B5 that is used to select the user address acquired from the portable terminal 3 as the transmission source address, and a button B6 that is used to select the electronic mail address of the information processing apparatus 2 as the transmission source address are displayed on the operation screen, and the user can operate any one of the button B5 and the button B6. In addition, in a case where the button B5 is operated by the user, the mail creating unit 32a sets the user address acquired from the portable terminal 3 to the transmission source of the one electronic mail 9. In addition, in a case where the button B6 is operated by the user, the mail creating unit 32a sets the electronic mail address of the information processing apparatus 2 to the transmission source of the one electronic mail 9.

Figure 11B:
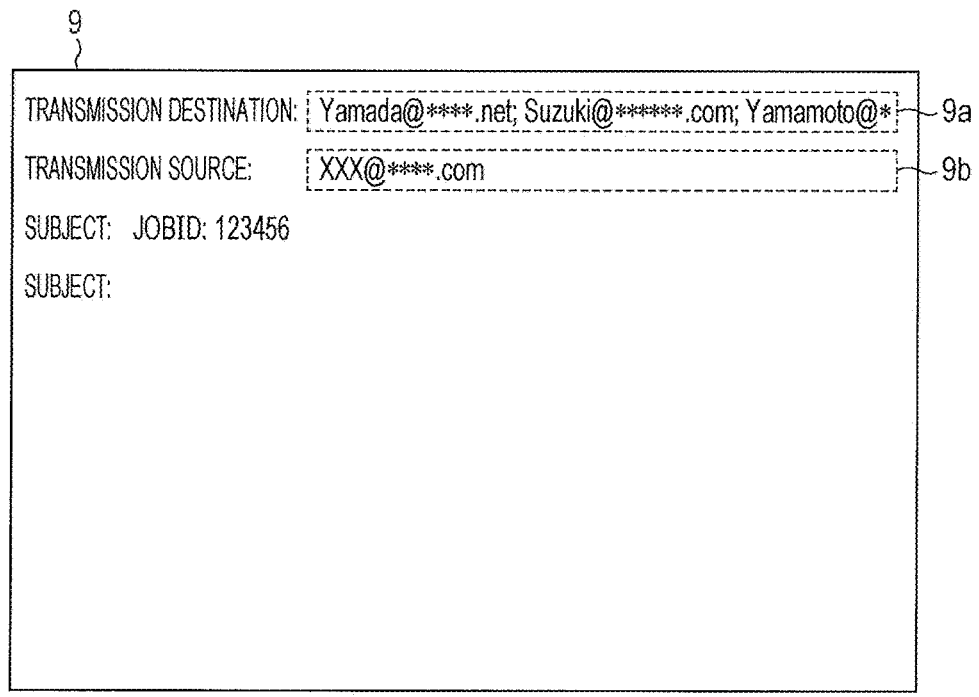

FIG. 11B illustrates an example of the electronic mail 9 that is created as described above. Furthermore, FIG. 11B illustrates a case where setting of the user address, which is acquired from the portable terminal 3, to the transmission source is selected. In the electronic mail 9 illustrated in FIG. 11B, the address, which is obtained by merging the transmission destination address selected from the address book 54 of the portable terminal 3, and the transmission destination address selected from the address book 23 of the information processing apparatus 2, is set as the transmission destination in the transmission destination address column 9a. In addition, the user address selected by the user is set as the transmission source in the transmission source address column 9b. In addition, the information processing apparatus 2 transmits the image data 8, which is created by performing the operation of reading the original document 7 with the scanning function, in a state of being attached to the electronic mail 9.

In addition, when merging the transmission destination address selected from the address book 54 of the portable terminal 3, and the transmission destination address selected from the address book 23 of the information processing apparatus 2, the mail creating unit 32a determines whether or not the same address is included in the transmission destination address selected from the address book 23 of the information processing apparatus 2, and the transmission destination address selected from the address book 54 of the portable terminal 3. In a case where the same address is included, the mail creating unit 32a deletes any one of the addresses in order for a plurality of same addresses not to be included in the merged transmission destination address. According to this, it is possible to prevent a plurality of the same electronic mails 9 from being transmitted to the same transmission destination.

Next, description will be given of a case where a plurality of user addresses are registered in the portable terminal 3. A plurality of user addresses which are different in an electronic mail account may be registered in the portable terminal 3 that is used by the user. In this case, it is necessary to select one user address to be set as a transmission source of the electronic mail 9 among the plurality of user addresses. Examples of a method of selecting one user address from the plurality of user addresses include a first method and a second method.

Figure 12A:
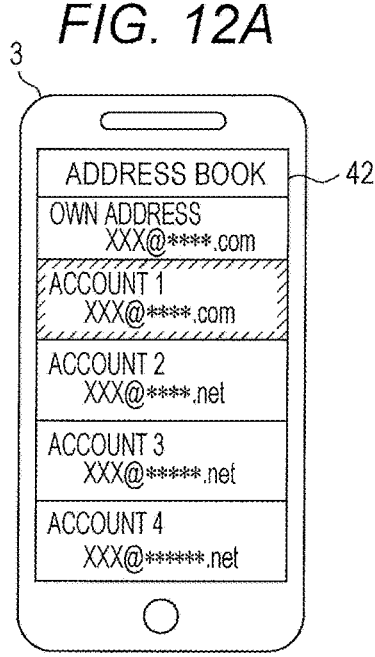
FIGS. 12A and 12B are views illustrating an example of an operation screen in a case of selecting a user address in the portable terminal.

First, description will be given of the first method. The first method is a method of selecting one user address from the plurality of user addresses in the portable terminal 3. In this first method, when the address book application 60 outputs a user address to the cooperation application 70, an operation screen, on which a user can select one user address to be set as a transmission source among the plurality of user addresses, is displayed on the display unit 42. FIG. 12A is a view illustrating an example of a user address selection screen that is displayed on the display unit 42 of the portable terminal 3 in accordance with the above-described configuration. When the user address selection screen as illustrated in FIG. 12A is displayed in the portable terminal 3, as is the case with the above-described address selection screen, the cooperation application 70 acquires screen information corresponding to the user address selection screen from the address book application 60, and transmits the screen information to the information processing apparatus 2.

Figure 12B:
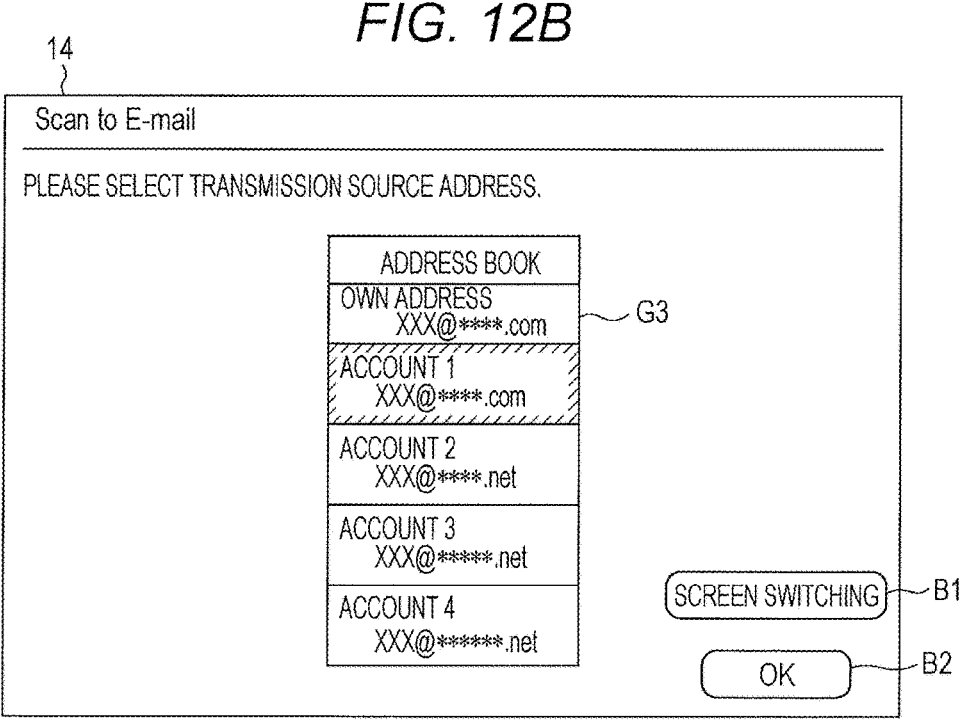

When acquiring the screen information corresponding to the user address selection screen from the portable terminal 3, the information processing apparatus 2 performs the same processing as in the case of the address selection screen, and displays the same screen as the user address selection screen displayed in the portable terminal 3 on the display unit 14 of the operation panel 13. FIG. 12B is a view illustrating an example of a screen that is displayed on the display unit 14 of the operation panel 13. The screen includes the same screen image G3 as in the user address selection screen displayed in the portable terminal 3, and the user can select a user address by performing an operation with respect to the screen image G3. In addition, when one point on the screen image G3 is operated by the user, the information processing apparatus 2 transmits operation information including operation position coordinates to the portable terminal 3.

When acquiring the operation information from the information processing apparatus 2, the portable terminal 3 outputs the operation information from the cooperation application 70 to the address book application 60. In addition, the address book application 60 specifies one user address selected by the user on the basis of the operation position coordinates included in the operation information, and outputs the specified user address to the cooperation application 70. In addition, the cooperation application 70 transmits the one user address acquired from the address book application 60 to the information processing apparatus 2. Accordingly, even in a case where the plurality of user addresses are registered in the portable terminal 3, the information processing apparatus 2 can acquire one user address from the portable terminal 3.

Next, description will be given of the second method. The second method is a method of selecting one user address from a plurality of the user addresses in the information processing apparatus 2. In the second method, when outputting a user address to the cooperation application 70, the address book application 60 outputs the entirety of the plurality of user addresses to the cooperation application 70. At this time, the address book application 60 reads out account information that is correlated with each of the plurality of user addresses, and outputs the user address and the account information to the cooperation application 70 in correlation with each other. In addition, the cooperation application 70 transmits the plurality of user addresses and a plurality of pieces of the account information which are correlated with the plurality of user addresses to the information processing apparatus 2.

When receiving the plurality of user addresses and the plurality of pieces of account information which are correlated with the plurality of user addresses from the portable terminal 3, the information processing apparatus 2 displays a user address selection screen, on which the user can select one user address, on the display unit 14. That is, when acquiring the plurality of user addresses from the terminal control unit 33, the mail creating unit 32a creates the user address selection screen on which the user can select one user address to be set as a transmission source among the plurality of user addresses, and outputs the user address selection screen to the panel control unit 30 in order for the user address selection screen to be displayed on the display unit 14.

Figure 13:
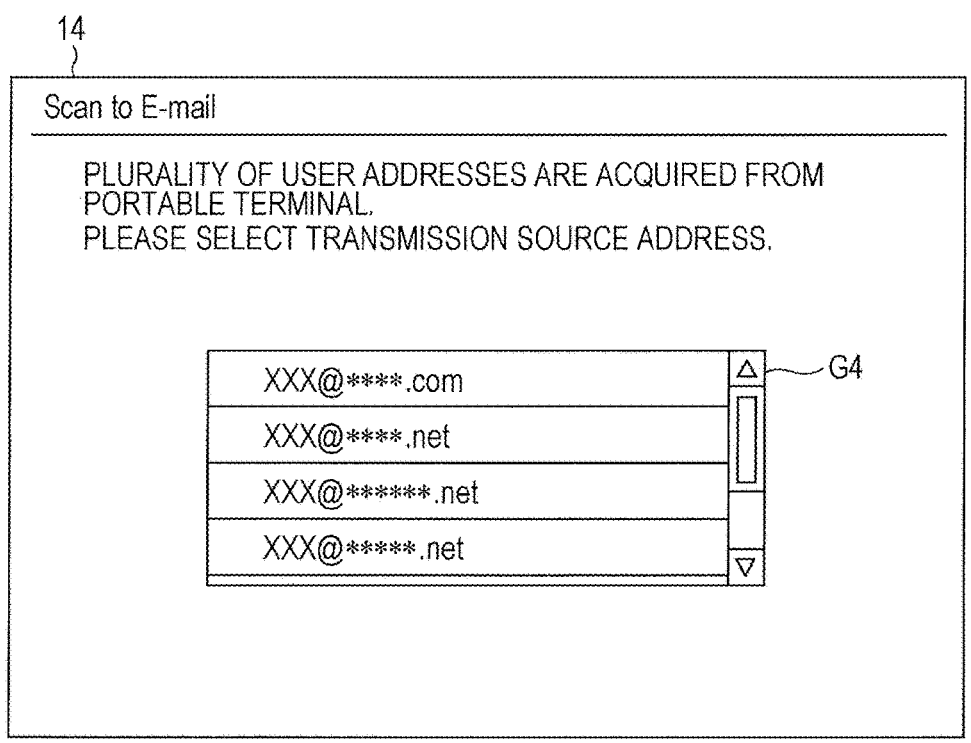
FIG. 13 is a view illustrating an example of an operation screen in a case of selecting a user address in the information processing apparatus.

FIG. 13 is a view illustrating an example of the user address selection screen that is displayed on the display unit 14 at this time. A user address selection column G4, in which one user address is selected from the plurality of user addresses registered in the portable terminal 3, is displayed on the user address selection screen illustrated in FIG. 13.

Accordingly, when the user address selection screen is displayed on the display unit 14 of the operation panel 13, the user can select one user address to be set to a transmission source of the electronic mail 9 by operating the operation panel 13.

When creating the above-described user address selection screen, the mail creating unit 32a analyzes account information that is correlated with each of the plurality of user addresses, and determines a display rank when displaying the plurality of user addresses in the user address selection column G4. More specifically, the mail creating unit 32a reads out the account rank information 28 from the information storage unit 26. The account rank information 28 is information in which various electronic mail accounts are ranked in advance on the basis of reliability such as security, and is determined in such a manner that an electronic mail account with high reliability has a higher rank. Accordingly, the mail creating unit 32a ranks the plurality of user addresses acquired from the terminal control unit 33 on the basis of the account rank information 28, and allows a user address of an electronic mail account with high reliability to be displayed with a higher rank in the user address selection column G4. At this time, in a case where a user address of an electronic mail account, which is not included in the account rank information 28, exists in the plurality user addresses acquired from the terminal control unit 33, the mail creating unit 32a may allow the user address not to be displayed in the user address selection column G4. When the user address of the electronic mail account with high reliability is displayed with a higher rank, it is possible to prevent a user address of an electronic mail account, which is not intended by a manager, from being set to the transmission source of the electronic mail 9 that is transmitted from the information processing apparatus 2.

Figure 14:
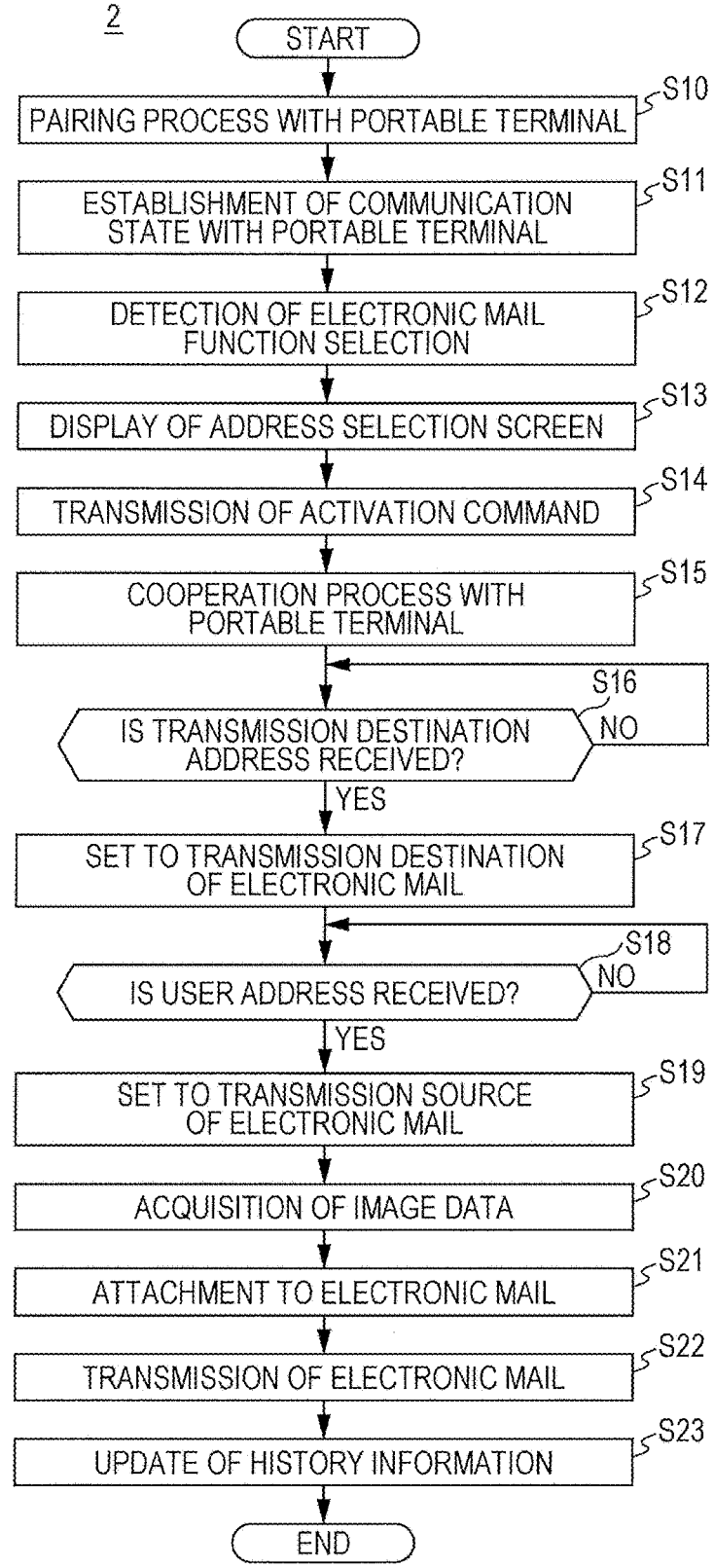
FIG. 14 is a flowchart illustrating an example of a processing procedure that is carried out by the information processing apparatus.

Next, description will be given of a basic processing procedure that is performed in the information processing apparatus 2. FIG. 14 is a flowchart illustrating an example of the processing procedure that is carried out by the information processing apparatus 2. The processing is carried out when the above-described program 21 is executed in the information processing apparatus 2. When initiating the processing, first, the information processing apparatus 2 performs a pairing process with the portable terminal 3 (step S10), and establishes a connection state capable of communicating with the portable terminal 3 (step S11). Subsequently, when detecting that the electronic mail function is selected by a user (step S12), the information processing apparatus 2 operates the electronic mail function unit 32 to display the address selection screen based on the address book 23 of the information processing apparatus 2 on the display unit 14 of the operation panel 13 (step S13). In addition, the information processing apparatus 2 transmits a command of activating the address book application 60 to the portable terminal 3 in accordance with initiation of the operation of the electronic mail function unit 32 (step S14). Then, the information processing apparatus 2 initiates a cooperation process with the portable terminal 3 (step S15). In the cooperation process, a process of displaying various screens on the display unit 14 of the operation panel 13 on the basis of the screen information received from the portable terminal 3, or a process of transmitting the operation information based on the operation by the user to the portable terminal 3 is performed.

Then, when receiving the transmission destination address from the portable terminal 3 (YES in step S16), the information processing apparatus 2 sets the transmission destination address to the transmission destination of the electronic mail 9 (step S17). In addition, when receiving a user address from the portable terminal 3 (YES in step S18), the information processing apparatus 2 sets the user address to the transmission source of the electronic mail 9 (step S19). In addition, the information processing apparatus 2 acquires the image data 8 to be attached to the electronic mail 9 (step S20). For example, the image data 8 is acquired by reading the original document 7, which is set by the user, by driving the image reading unit 12. In addition, the information processing apparatus 2 attaches the image data 8 to the electronic mail 9 (step S21), and transmits the electronic mail 9 (step S22). In addition, finally, the information processing apparatus 2 updates the history information 27 (step S23).

FIG. 15 is a view illustrating an example of the history information 27 that is recorded in the information processing apparatus 2. As illustrated in FIG. 15, the history information 27 includes date information 27a at which a job is executed in the information processing apparatus 2, job information 27b representing a type of the job, transmission destination address information 27c in which the transmission destination address is recorded, transmission source address information 27d in which the transmission source address is recorded, and terminal information 27e. Furthermore, in addition to the plurality of pieces of information, for example, the image data 8 attached to the electronic mail 9 may be recorded in the history information 27. The plurality of pieces of information are recorded in the history information 27, and thus a manager can specify the electronic mail 9 to be transmitted to which transmission destination address with which transmission source address. In addition, since the terminal information 27e is recorded in the history information 27, in a case where an unauthorized electronic mail 9 is transmitted, it is possible to allow the cooperation process with the portable terminal 3, which can be used for transmission of the unauthorized electronic mail 9, not to be carried out.

Figure 16:
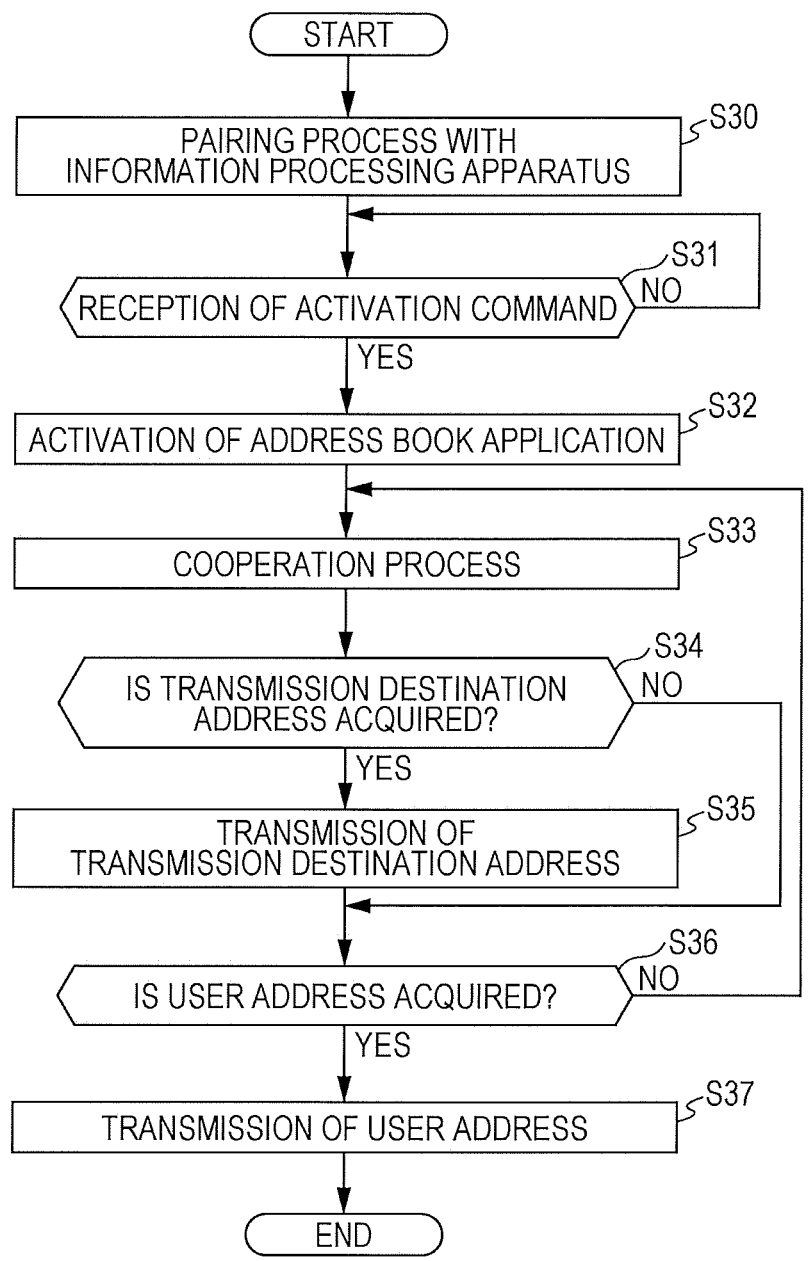
FIG. 16 is a flowchart illustrating an example of a processing procedure that is carried out by a cooperation application of the portable terminal.

Next, description will be given of a basic processing procedure that is carried out by the cooperation application 70 of the portable terminal 3. FIG. 16 is a flowchart illustrating an example of a processing procedure that is carried out by the cooperation application 70 of the portable terminal 3. This processing is carried out when the cooperation program 51 is executed in the portable terminal 3. When the processing is initiated, first, the cooperation application 70 performs a pairing process with the information processing apparatus 2 to establish a connection state capable of communicating with the information processing apparatus 2 (step S30). Then, the cooperation application 70 waits until receiving a command of activating the address book application 60 from the information processing apparatus 2 (step S31). When receiving the activation command (YES in step S31), the cooperation application 70 activates the address book application 60 in the portable terminal 3 (step S32). Then, the cooperation application 70 initiates a cooperation process of cooperating the address book application 60 and the information processing apparatus 2 (step S33). In the cooperation process, a process of transmitting the screen information output from the address book application 60 to the information processing apparatus 2, or a process of outputting the operation information received from the information processing apparatus 2 to the address book application 60 is carried out.

In addition, the cooperation application 70 determines whether or not the transmission destination address designated by a user is acquired from the address book application 60 (step S34). When the transmission destination address has been acquired (YES in step S34), the cooperation application 70 transmits the transmission destination address to the information processing apparatus 2 (step S35). In addition, the cooperation application 70 determines whether or not the user address has been acquired from the address book application 60 (step S36). In a case where the user address has been acquired (YES in step S36), the cooperation application 70 transmits the user address to the information processing apparatus 2 (step S37). At this time, the cooperation application 70 acquires account information of the user address in combination with the user address, and transmits the user address and the account information in correlation with each other to the information processing apparatus 2.

Figure 17:
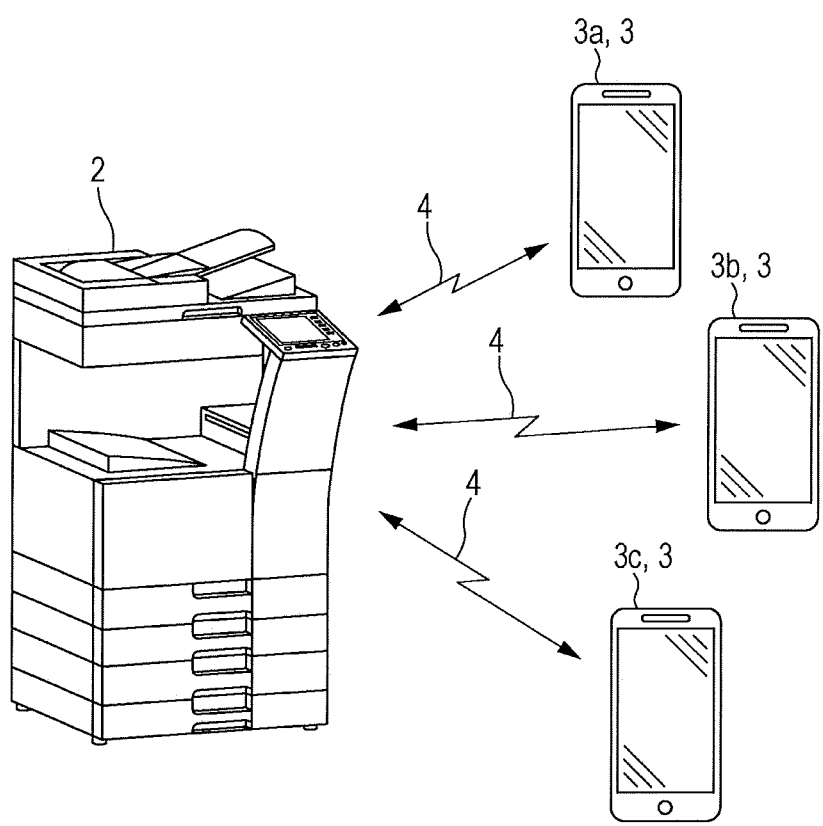
FIG. 17 is a view illustrating a state in which the information processing apparatus simultaneously establishes a connection state with a plurality of the portable terminals.

Next, description will be given of a case where the information processing apparatus 2 simultaneously establishes the connection state 4 with a plurality of the portable terminals 3, and transmits the electronic mail 9 thereto. FIG. 17 is a view illustrating a state in which the information processing apparatus 2 simultaneously establishes the connection state 4 with the plurality of portable terminals 3. Furthermore, FIG. 17 illustrates a state in which three portable terminals 3a, 3b, and 3c establish the connection state 4 with the information processing apparatus 2. The plurality of portable terminals 3a, 3b, and 3c may be portable terminals carried by the same user, or portable terminals carried by different users.

In a case where the above-described cooperation application 70 is activated in the plurality of portable terminals 3a, 3b, and 3c, and the plurality of portable terminals 3a, 3b, and 3c are in a range capable of communicating with the information processing apparatus 2, the information processing apparatus 2 performs a pairing process with each of the plurality of portable terminals 3a, 3b, and 3c to respectively establish the connection state 4. According to this, the information processing apparatus 2 initiates a process of performing a cooperation operation with each of the plurality of portable terminals 3a, 3b, and 3c.

Figure 18:
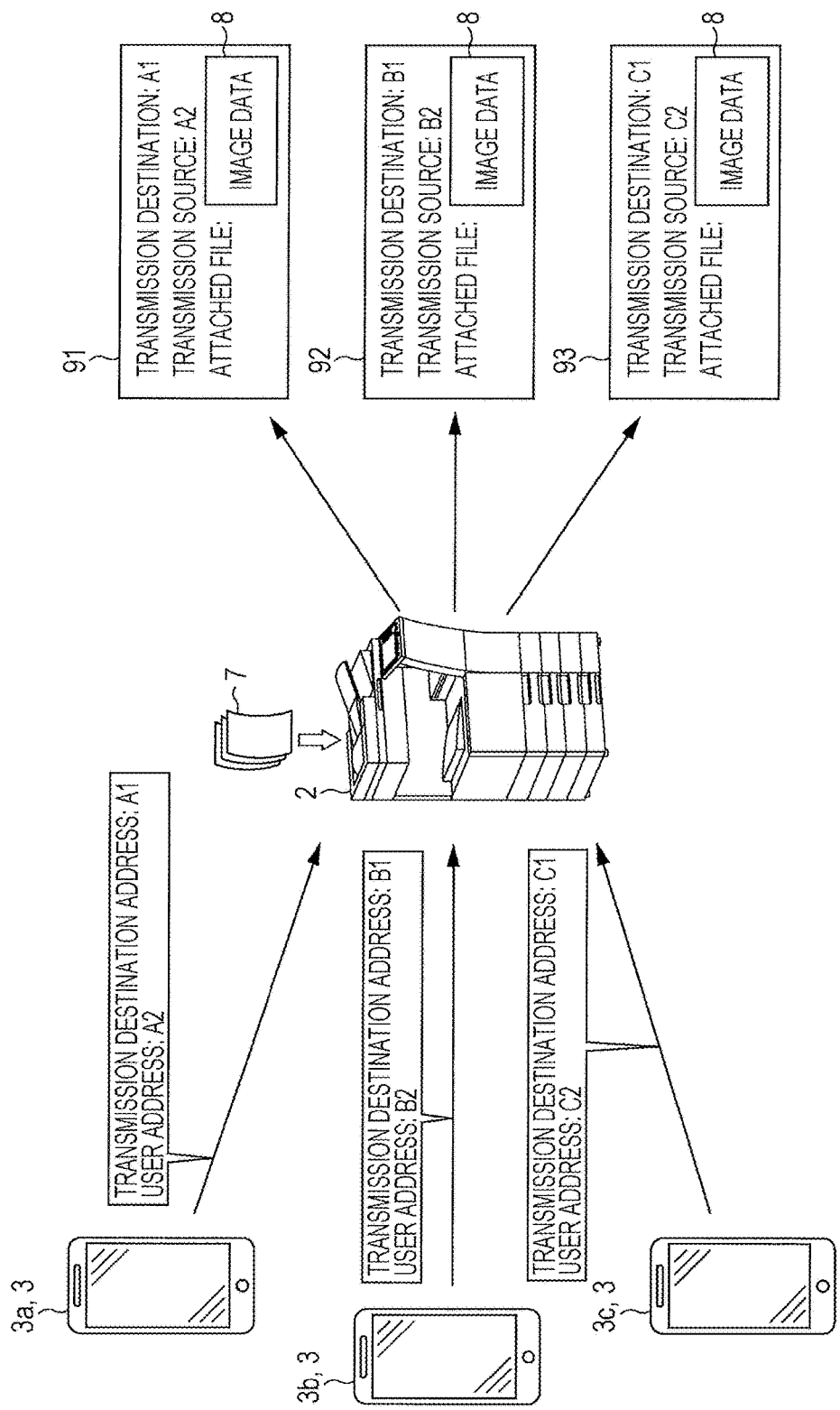
FIG. 18 is a view illustrating an overview of an operation in a case where the information processing apparatus and the plurality of portable terminals cooperate with each other.

FIG. 18 is a view illustrating an overview of an operation in a case where the information processing apparatus 2 transmits image data, which is created with the scanning function, in a state of being attached to an electronic mail in cooperation with the plurality of the portable terminals 3a, 3b, and 3c. When the cooperation operation with the plurality of the portable terminals 3a, 3b, and 3c is initiated, the information processing apparatus 2 transmits a command of activating the address book application 60 to the plurality of portable terminals 3a, 3b, and 3c. According to this, the address book application 60 is activated in each of the plurality of portable terminals 3a, 3b, and 3c. As a result, the address selection screen by the address book application 60 is automatically displayed in each of the portable terminals 3a, 3b, and 3c.

In addition, when a user who operates the portable terminal 3a performs an operation with respect to the address selection screen, and selects an electronic mail address that becomes an electronic mail transmission destination, the portable terminal 3a transmits the electronic mail address selected by the user to the information processing apparatus 2 as the transmission destination address, and transmits a user address registered in the portable terminal 3a to the information processing apparatus 2. In addition, when a user who operates the portable terminal 3b performs an operation with respect to the address selection screen, and selects an electronic mail address that becomes a transmission destination of an electronic mail, the portable terminal 3b transmits the electronic mail address selected by the user to the information processing apparatus 2 as the transmission destination address, and transmits a user address registered in the portable terminal 3b to the information processing apparatus 2. In addition, when a user who operates the portable terminal 3c performs an operation with respect to the address selection screen, and selects an electronic mail address that becomes a transmission destination of an electronic mail, the portable terminal 3c transmits the electronic mail address selected by the user to the information processing apparatus 2 as the transmission destination address, and transmits a user address registered in the portable terminal 3c to the information processing apparatus 2. Accordingly, the information processing apparatus 2 can acquire the transmission destination address and the user address from each of the plurality of portable terminals 3a, 3b, and 3c. Furthermore, when transmitting the user address to the information processing apparatus 2, each of the portable terminals 3a, 3b, and 3c simultaneously transmits account information corresponding to the user address to the information processing apparatus 2.

In addition, when the address selection screen is displayed in each of the plurality of portable terminals 3a, 3b, and 3c, as described above, the screen information is transmitted from each of the portable terminals 3a, 3b, and 3c to the information processing apparatus 2. Accordingly, the information processing apparatus 2 can display the same screen as the address selection screen that is displayed in each of the portable terminals 3a, 3b, and 3c on the display unit 14 of the operation panel 13. At this time, if the panel control unit 30 simultaneously displays a plurality of the address selection screens based on a plurality of pieces of screen information which are respectively acquired from the plurality of portable terminals 3a, 3b, and 3c on one screen of the display unit 14, the size of the individual address selection screens is reduced, and thus it is difficult for a user to operate the address selection screens. Accordingly, it is preferable that the plurality of address selection screens are not simultaneously displayed on one screen of the display unit 14, and for example, the address selection screens are displayed one by one as illustrated in FIG. 6B. In this case, in accordance with an operation of the screen switching button B1 by the user, the information processing apparatus 2 sequentially switches the address selection screen that is displayed on the display unit 14 to an address selection screen based on screen information acquired from another portable terminal 3. According to this, the size of the individual address selection screens is not reduced, and thus an operation by the user becomes easy.

In addition, when detecting an operation by the user with respect to the same screen as the address selection screen that is displayed in each of the portable terminals 3a, 3b, and 3c, the information processing apparatus 2 transmits operation information based on the operation to the portable terminals 3a, 3b, and 3c. For example, in a case where the address selection operation by the user is performed when the same screen as the address selection screen displayed in the portable terminal 3a is displayed on the operation panel 13, the information processing apparatus 2 transmits the operation information to the portable terminal 3a. According to this, the portable terminal 3a can specify a transmission destination address that is designated by the user. Furthermore, this is also true of a case where the address selection operation by the user is performed when the same screen as the address selection screen displayed in each of the other portable terminals 3b and 3c is displayed in the operation panel 13.

When acquiring the transmission destination address and the user address from each of the plurality of portable terminals 3a, 3b, and 3c, the information processing apparatus 2 automatically creates a plurality of electronic mails 91, 92, and 93 which respectively correspond to the plurality of portable terminals 3a, 3b, and 3c. That is, the mail creating unit 32a of the information processing apparatus 2 creates the electronic mail 91 corresponding to the portable terminal 3a, and sets the transmission destination address acquired from the portable terminal 3a to the transmission destination of the electronic mail 91, and sets the user address acquired from the portable terminal 3a to the transmission source. In addition, the mail creating unit 32a creates the electronic mail 92 corresponding to the portable terminal 3b, and sets the transmission destination address acquired from the portable terminal 3b to the transmission destination of the electronic mail 92, and sets the user address acquired from the portable terminal 3b to the transmission source. In addition, the mail creating unit 32a creates the electronic mail 93 corresponding to the portable terminal 3c, and sets the transmission destination address acquired from the portable terminal 3c to the transmission destination of the electronic mail 93, and sets the user address acquired from the portable terminal 3c to the transmission source. At this time, the information processing apparatus 2 analyzes the transmission destination address that is set to the transmission destination of each of the plurality of electronic mails 91, 92, and 93. In a case where the same address is included, the information processing apparatus 2 may display an alarm screen on the operation panel 13 to urge the user to select one address.

In addition, the information processing apparatus 2 automatically attaches the image data 8, which is created by reading the original document 7 with the scanning function, to each of the plurality of electronic mails 91, 92, and 93 as an attached file. That is, the image data 8 is attached to each of the plurality of electronic mails 91, 92, and 93 through an original document reading operation that is performed once with the scanning function. Then, the information processing apparatus 2 transmits the plurality of electronic mails 91, 92, and 93 through an external mail server that is designated in advance. According to this transmission type, it is possible to reduce the number of times of reading of the original document 7 with the scanning function, and thus working efficiency is significantly improved.

As described above, the information processing apparatus 2 according to this embodiment transmits the command of activating the address book application 60 to the portable terminal 3, and acquires the transmission destination address and the user address from the address book application 60 that is activated in the portable terminal 3. In addition, the information processing apparatus 2 automatically creates the electronic mail 9 in which the transmission destination address is set to the transmission destination, and the user address is set to the transmission source, and transmits the image data 8 in a state of being attached to the electronic mail 9. Accordingly, it is not necessary for the user to perform an operation of inputting image data, which is created with the scanning function of the information processing apparatus 2, to the portable terminal 3, an operation of designating the image data as an attached file, and the like, and the user can transmit the image data by setting a user address of the user to the transmission source of the electronic mail 9 through a simple operation. Accordingly, operation load of the user is reduced, and thus convenience is improved when transmitting the image data with the electronic mail.

Hereinbefore, description has been given of one embodiment of the invention. However, the invention is not limited to the description in the embodiment, and various modification examples can be applied to the invention.

For example, in the example, description has been given of an example in which the information processing apparatus 2 is constituted by an MFP, which has a plurality of functions such as a scanning function, a printing function, a network function, a FAX function, an electronic mail function, and a BOX function, and the like. However, the information processing apparatus 2 is not necessarily limited to the MFP. That is, the information processing apparatus 2 may be an apparatus that has the electronic mail function and is shared by a plurality of users. Accordingly, the information processing apparatus 2 may be a printer or a scanner that has the electronic mail function. In addition, the information processing apparatus 2 may be constituted by a typical personal computer (PC) that is shared to be used by the plurality of users. In addition, the electronic mail function in the information processing apparatus 2 may have a function of transmitting the electronic mail, and may not have a function of receiving the electronic mail.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An information processing apparatus that has an electronic mail function and is capable of operating in cooperation with a portable terminal, the information processing apparatus comprising:
   a hardware processor configured to:
   perform a communication with the portable terminal;
   transmit a command of activating an address book application to the portable terminal in a case where the electronic mail function is selected, and to acquire a transmission destination address and a user address from the portable terminal;
   create an electronic mail in which the transmission destination address acquired by the hardware processor is set to a transmission destination of the electronic mail, and the user address acquired by the hardware processor is set to a transmission source of the electronic mail;
   acquire an image to be transmitted with the electronic mail;
   attach the acquired image to the created electronic mail, and
   transmit the electronic mail.

2. The information processing apparatus according to claim 1, wherein the hardware processor is further configured to read an original document to create image data, and
   acquire the image from the information processing apparatus.

3. The information processing apparatus according to claim 1, further comprising:
   a storage unit that stores an information processing apparatus address book in which an electronic mail address capable of being selected as a transmission destination of the electronic mail is registered,
   wherein in a case where the electronic mail function is selected, the information processing apparatus is capable of receiving a transmission destination address selecting operation performed by a user by reading and displaying an electronic mail address registered in the information processing apparatus address book.

4. The information processing apparatus according to claim 3,
wherein in a case where the electronic mail address registered in the information processing apparatus address book is selected as a transmission destination address of the electronic mail by a user, the hardware processor further creates an electronic mail in which the transmission destination address selected by the user is set to the transmission destination of the electronic mail.

5. The information processing apparatus according to claim 3,
wherein in a case where the electronic mail address registered in the information processing apparatus address book is selected as a transmission destination address of the electronic mail by a user, the hardware processor sets both of the transmission destination address acquired by the hardware processing unit from the portable terminal and the transmission destination address selected by the user as the transmission destination of the electronic mail, and sets any one of the user address acquired by the hardware processor, and an electronic mail address of the information processing apparatus as the transmission source of the electronic mail.

6. The information processing apparatus according to claim 4,
wherein in a case where the same address is included in the transmission destination address acquired by the hardware processor, and the transmission destination address selected by the user, the hardware processor performs an alarm display with respect to the user, and deletes any one of the same address that is included in the transmission destination address acquired by the hardware processor and the same address that is included in the transmission destination address selected by the user on the basis of a selection operation performed by the user.

7. The information processing apparatus according to claim 1,
wherein in a case where a plurality of user addresses are acquired from the portable terminal by the hardware processor, the hardware processor displays the plurality of user addresses, and sets one user address as the transmission source of the electronic mail on the basis of a selection operation performed by a user.

8. The information processing apparatus according to claim 7,
wherein when acquiring the user addresses from the portable terminal, the hardware processor further acquires account information of the user addresses,
when displaying the plurality of user addresses acquired by the hardware processor, the hardware processor analyzes each piece of account information of the plurality of user addresses, and displays the plurality of user addresses in a predetermined priority that is ranked in advance based on reliability.

9. The information processing apparatus according to claim 1, wherein the hardware processor is further configured to edit addresses of the transmission destination and the transmission source of the electronic mail that is created by the hardware processor on the basis of an operation performed by a user.

10. The information processing apparatus according to claim 1,
wherein after transmitting the command of activating the address book application to the portable terminal, the hardware processor displays an operation screen capable of being operated by a user on the basis of screen information that is received from the portable terminal, and transmits operation information to the portable terminal on the basis of an operation that is performed with respect to the operation screen by the user.

11. The information processing apparatus according to claim 1,
wherein the hardware processor communicates with a plurality of portable terminals,
in a case where the electronic mail function is selected in a state in which the communication unit communicates with the plurality of portable terminals, the hardware processor transmits the command of activating the address book application to each of the plurality of portable terminals through the communication unit, and acquires a transmission destination address and a user address from each of the plurality of portable terminals,
the hardware processor sets the transmission destination address, which is acquired from one of the plurality of portable terminals by the hardware processor, to the transmission destination of one electronic mail, and sets the user address, which is acquired from the one portable terminal by the hardware processor, to the transmission source of the one electronic mail so as to create a plurality of electronic mails on the basis of the transmission destination address and the user address which are received from each of the plurality of portable terminals, and
the hardware processor attaches the acquired image to each of the plurality of created electronic mails, and transmits the electronic mail.

12. The information processing apparatus according to claim 11,
wherein after transmitting the command of activating the address book application to each of the plurality of portable terminals, the hardware processor displays an operation screen capable of being operated by a user on the basis of screen information that is received from each of the plurality of portable terminals, and transmits operation information to each of the plurality of portable terminals on the basis of an operation that is performed with respect to the operation screen by the user.

13. A non-transitory recording medium storing a computer readable program that is executed in an information processing apparatus that is capable of communicating with a portable terminal, the program causing the information processing apparatus to execute:
a first step of transmitting a command of activating an address book application to the portable terminal in a case where an electronic mail function is selected, and of acquiring a transmission destination address and a user address from the portable terminal;
a second step of creating an electronic mail in which the transmission destination address acquired in the first step is set to a transmission destination of the electronic mail, and the user address acquired in the first step is set to a transmission source of the electronic mail;
a third step of acquiring an image to be transmitted with the electronic mail; and
a fourth step of attaching the image acquired in the third step to the electronic mail created in the second step, and of transmitting the electronic mail.

14. A non-transitory recording medium storing a computer readable program that is executed in a portable terminal that is capable of communicating with an information processing apparatus, the program causing the portable terminal to execute:

a first step of activating an address book application of the portable terminal when receiving a command of activating the address book application from the information processing apparatus, and of acquiring a transmission destination address of an electronic mail which is selected by a user, and a user address that is registered in the address book application from the address book application of the portable terminal; and a second step of transmitting the transmission destination address and the user address, which are acquired in the first step, to the information processing apparatus.

15. The non-transitory recording medium storing a computer readable program according to claim 14, wherein in the first step, account information of the user address is further acquired when acquiring the user address from the address book application, and in the second step, the user address and the account information, which are acquired in the first step, are correlated with each other, and are transmitted to the information processing apparatus.

16. The non-transitory recording medium storing a computer readable program according to claim 14, wherein in the first step, after activating the address book application, screen information for selection of the transmission destination address of the electronic mail by a user is acquired from the address book application, the screen information is transmitted to the information processing apparatus, and operation information based on the screen information and an operation by the user is output to the address book application.

* * * * *